US012675140B1

(12) United States Patent
Ding et al.

(10) Patent No.: US 12,675,140 B1
(45) Date of Patent: Jul. 7, 2026

(54) OPEN CLOSE DETECTION FOR FOLDABLE DISPLAYS

(71) Applicant: STMicroelectronics International N.V., Geneva (CH)

(72) Inventors: Yue Ding, Beijing (CN); Bowei Chen, Shenzhen (CN); Pengcheng Wen, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/013,811

(22) Filed: Jan. 8, 2025

(51) Int. Cl.
*G06F 1/16* (2006.01)
*G06F 3/041* (2006.01)

(52) U.S. Cl.
CPC .......... *G06F 1/1677* (2013.01); *G06F 1/1618* (2013.01); *G06F 1/1652* (2013.01); *G06F 1/1681* (2013.01); *G06F 3/04146* (2019.05)

(58) Field of Classification Search
CPC ............. G06F 1/1677; G06F 3/041461; G06F 1/1618; G06F 1/1652; G06F 1/1681
USPC ......................................... 345/156
See application file for complete search history.

(56) References Cited

U.S. PATENT DOCUMENTS

| | | | | |
|---|---|---|---|---|
| 10,712,862 | B1* | 7/2020 | Kang | G06F 1/1643 |
| 11,573,663 | B1* | 2/2023 | Yun | G06F 1/1641 |
| 2017/0285837 | A1* | 10/2017 | Zeng | G06F 1/1641 |
| 2018/0176347 | A1 | 6/2018 | Jeon et al. | |
| 2021/0034200 | A1* | 2/2021 | You | G01D 5/2417 |
| 2021/0149542 | A1 | 5/2021 | Kim et al. | |
| 2022/0214716 | A1* | 7/2022 | Kim | G06F 3/0443 |
| 2023/0239391 | A1 | 7/2023 | Zhou et al. | |
| 2024/0094845 | A1 | 3/2024 | Shen | |
| 2024/0184327 | A1* | 6/2024 | Zhang | G06F 1/183 |

* cited by examiner

*Primary Examiner* — Nathan P Brittingham
(74) *Attorney, Agent, or Firm* — Slater Matsil, LLP

(57) ABSTRACT

A method comprising measuring raw data by simultaneously driving a plurality of channels of a foldable device, collecting the raw data from a first channel on a first portion and a second channel on a second portion of the device, the first channel being positioned opposite from the second channel relative to a folding axis of the foldable device, determining a distance between the first channel and the second channel based on the collected raw data, generating a baseline capacitance based on the distance between the first channel and the second channel, filtering the generated baseline capacitance, calculating strength data based on the filtered baseline capacitance and the collected raw data; and determining a folding state based on the calculated strength data.

22 Claims, 19 Drawing Sheets

100

111  Analog Block    Digital Block  112

110

Memory  113

Touchscreen Controller

Flexible Touchscreen  102

Host  114

102

116  Touch sensing layer

118  Display layer

1300

1400

1402 — Collect raw data

1404 — Generate baseline

1406 — Create filtered baseline

1408 — Calculate strength

1410 — Determine folding state

1600

1602 — Collect raw data

1604 — Generate baseline

1606 — Calculate strength

1608 — Integrate strength

1610 — Determine folding state transition

OPEN CLOSE DETECTION FOR FOLDABLE DISPLAYS

TECHNICAL FIELD

The present invention relates generally to electronic devices, and, in particular embodiments, to open close detection of a foldable device.

BACKGROUND

Foldable devices, such as smartphones and tablets with flexible displays, have become increasingly popular in recent years. These devices offer users the advantage of a larger screen area while maintaining a compact form factor when folded. As the technology for flexible displays has advanced, so too has the need for robust and efficient methods to detect the folding state of these devices. Accurate detection of whether a device is open or closed is crucial for proper functionality, user interface adjustments, and power management.

Traditionally, detecting the folding state of a device has relied on dedicated sensors or complex mechanical systems. However, these approaches can increase manufacturing costs, complicate device design, and potentially reduce reliability due to the addition of extra components. As foldable devices continue to evolve, there is a growing need for more integrated and efficient solutions that can accurately detect the folding state without compromising the device's form factor or increasing its complexity.

SUMMARY

Embodiments of the present application provide a method for open close detection for foldable displays. As discussed below, embodiments relate to foldable touchscreen devices.

One general aspect includes a method that includes measuring raw data by simultaneously driving a plurality of channels of a foldable device and collecting the raw data from a first channel on a first portion and a second channel on a second portion of the device. The first channel is positioned opposite from the second channel relative to a folding axis of the foldable device. The method further includes determining a distance between the first channel and the second channel based on the collected raw data, generating a baseline capacitance based on the distance between the first channel and the second channel, filtering the generated baseline capacitance, calculating strength data based on the filtered baseline capacitance and the collected raw data, and determining a folding state based on the calculated strength data.

Another general aspect includes a method that includes rotating a first portion of a touchscreen with respect to a second portion of the touchscreen around a hinge and collecting raw data from a first edge and a second edge of the touchscreen over a plurality of frames. The first edge is on the first portion of the touchscreen and the second edge is on the second portion of the touchscreen. The method further includes generating a baseline capacitance based on an average of the collected raw data, calculating strength data based on a difference between a current raw data and the average of the collected raw data, integrating the strength data over a noise level, comparing the integrated strength data with an open/close threshold, and changing an open/close state from a previous open/close state when the integrated strength data is greater than or equal to an open/close threshold.

Another general aspect includes a device that includes a first touchscreen portion, a second touchscreen portion, a hinge connecting the first touchscreen portion and the second touchscreen portion, and a touch controller. The touch controller is configured to simultaneously drive a plurality of drive channels to measure raw data, receive raw data from a first receive channel of the first touchscreen portion and a corresponding second receive channel of the second touchscreen portion, wherein the first receive channel and the second receive channel are perpendicular to the drive channels, determine a distance between the first receive channel and the second receive channel, generate a baseline capacitance based on the distance between the first receive channel and the second receive channel. filter the generated baseline capacitance, calculate strength data based on the filtered baseline capacitance and the received raw data, and determine a folding state based on the calculated strength data.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

While foldable displays have led to great advances in the evolution of portable electronic devices, due to their delicate nature, there are still limitations that exist. Namely, foldable displays capable of being enlarged by unfolding and reduced by folding require additional electrical components, such as hall sensors, to detect the folding angle which can lead to an increase in power consumption and an increase in manufacturing costs.

Embodiments of the present application relate to a foldable device that includes a first touchscreen portion and a second touchscreen portion connected by a hinge. The device includes a touch controller configured to simultaneously drive multiple channels to measure raw data from both touchscreen portions. The touch controller collects raw data from outer edges of the touchscreen portions of the foldable device, determines the distance between these edges, generates a baseline capacitance, and filters it. By calculating a strength based on the filtered baseline and collected raw data, the touch controller can detect the folding state of the device.

Embodiments of the present application utilize existing touchscreen components for fold detection to eliminate the need for additional sensors, thereby reducing cost and simplifying device design. The method can be adapted to various foldable device configurations and can provide accurate folding state detection across different environmental conditions. By integrating fold detection into the touch sensing system, the solution offers a more streamlined and efficient approach to managing the functionality of foldable devices.

Figure 1A:
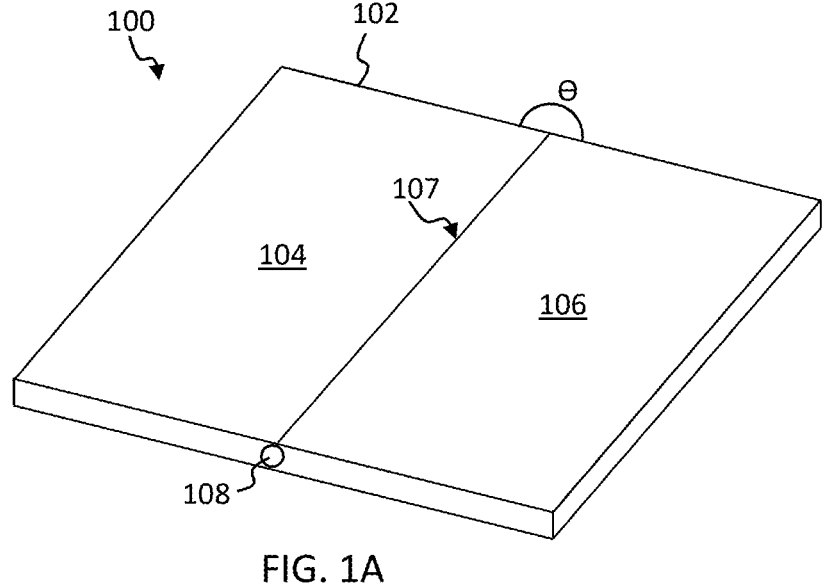
FIGS. 1A-1B illustrate a schematic view of an electronic device having a foldable touchscreen according to an embodiment of the present application.
Figure 1B:
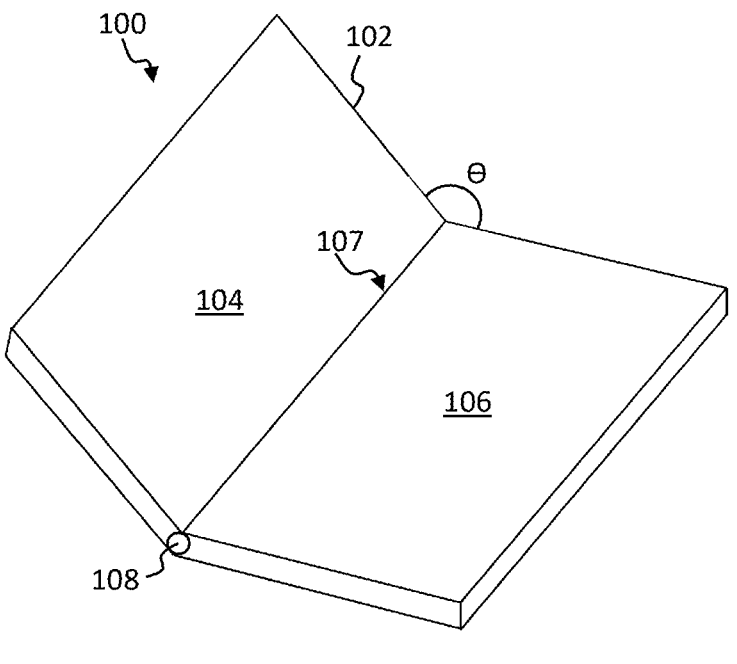
Figure 2A:
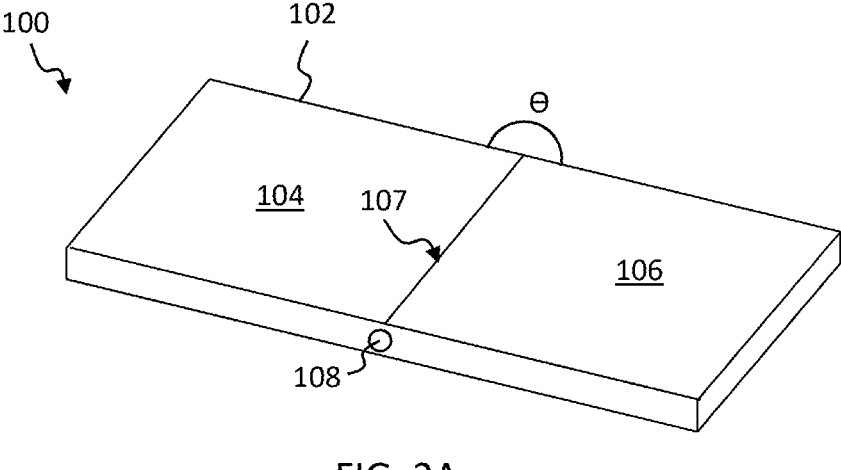
FIGS. 2A-2B illustrate schematic views of an electronic device having a foldable touchscreen according to an embodiment of the present application.
Figure 2B:
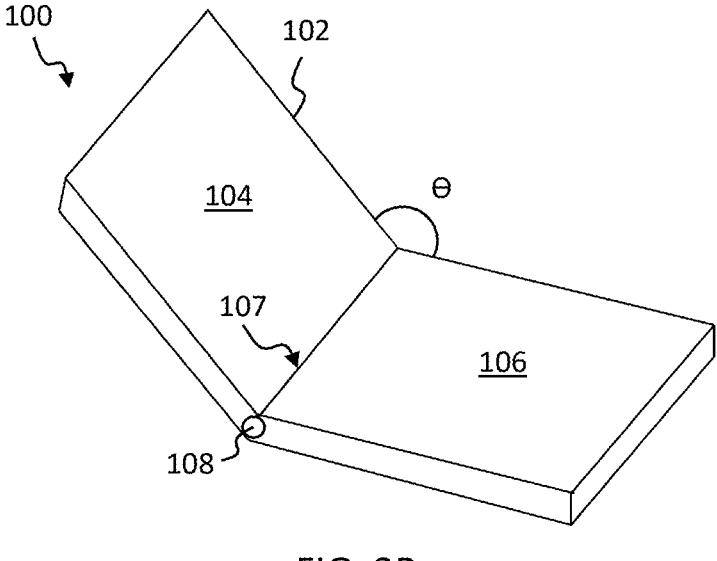

FIGS. 1A-1B and 2A-2B illustrate schematic views of an electronic device having a flexible touchscreen according to an embodiment of the present application, wherein FIGS. 1A and 2A illustrate schematic views of the electronic device in a fully open position and FIGS. 1B and 2B illustrate schematic views of the electronic device in a partially open position.

FIGS. 1A-1B and 2A-2B illustrate an electronic device 100 in different configurations. The electronic device 100 comprises a flexible touchscreen 102 that includes a first portion 104, a second portion 106, and a hinge 108 connecting the first portion 104 and the second portion 106. While described herein as a flexible touchscreen 102, concepts discussed herein also apply to foldable touchscreens. In various embodiments, the electronic device 100 may be a smartphone, tablet, laptop, gaming system, or other portable electronic device with a foldable display.

In the illustrations shown in FIGS. 1A-1B, the electronic device 100 is oriented so that the flexible touchscreen 102 is configured to be rotated across its length, i.e., the longer of the two perpendicular edges. In other words, the hinge 108 is parallel to the length of the flexible touchscreen 102. This is known as fold mode. In other embodiments of the electronic device 100, the electronic device 100 may be oriented so that the flexible touchscreen 102 is configured to be rotated across its width as shown in FIGS. 2A-2B. This is known as flip mode.

In various embodiments, the flexible touchscreen 102 may comprise a first portion 104, a second portion 106, and a folding axis 107. The flexible touchscreen 102 may comprise a light emitting diode (LED) flexible display, organic LED flexible display, or any other type of flexible touchscreen 102. The flexible touchscreen 102 may be configured to be folded or unfolded by rotating the first portion towards or away from the second portion 106 along a folding axis 107. The folding axis 107 may include a foldable element such as a hinge 108. In other words, the folding axis 107 may include any element that allows the first portion 104 to be rotated with respect to the second portion 106 (and vice versa). The hinge 108 is located at the folding axis 107 between the first portion 104 and the second portion 106, allowing the device to fold and unfold. For example, the first portion 104 and the second portion 106 may be separate elements coupled by the folding element at the folding axis 107 or may be formed as a single body.

The flexible touchscreen 102 may be configured to be rotated to a folding angle θ. The folding angle θ may be defined as the angle between the first portion 104 and the second portion 106 around the folding axis 107. In other words, the folding axis 107 may allow various degrees of rotation between the first portion 104 and the second portion 106. In various embodiments, the flexible touchscreen 102 may be configured to be rotated to any angle between a completely unfolded position shown in FIG. 2A to a completely folded position. In other words, the folding angle θ may range from 180 degrees (e.g. the open position) to 0 degrees (e.g. the closed position). Alternatively, the folding angle θ may range from 0 degrees to 360 degrees, or angles in between.

FIGS. 1B and 2B illustrate the flexible touchscreen 102 in a partially folded position where the first portion 104 is partially rotated towards the second portion 106 around the folding axis 107. The first portion 104 and the second portion 106 of the flexible touchscreen 102 are shown at an angle θ to each other. The angle θ represents the degree of folding, which can vary from 0° (fully closed) to potentially 180° or more (fully open as shown in FIGS. 1A and 2A). As the device folds, the flexible touchscreen 102 bends along the folding axis 107.

In one or more embodiments, the folding capability of the electronic device 100 allows for various use cases. When fully opened, as in FIG. 1A, the device can function as a large tablet or display. In the partially folded state shown in FIG. 1B, the device might be used in a laptop-like configuration, with the first portion 104 serving as a display and the second portion 106 as an input area, as secondary display, or as a stand for the device.

Figure 3:
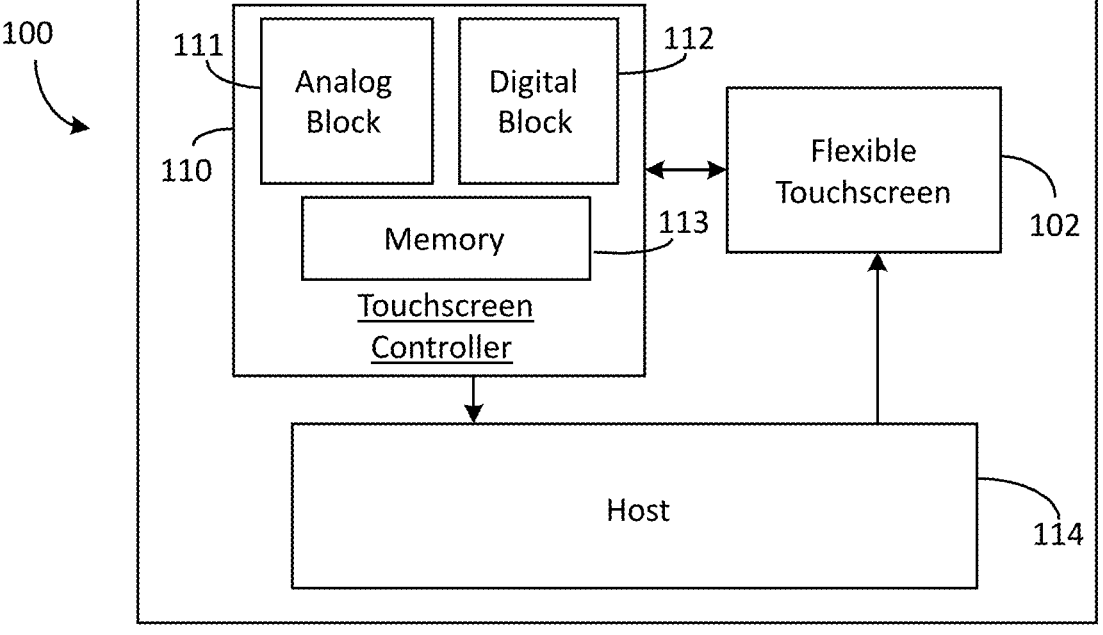
FIG. 3 illustrates a component schematic of the electronic device according to an embodiment of the present application.

FIG. 3 illustrates a component block diagram of the electronic device according to an embodiment of the present application. The electronic device 100 may include a touchscreen controller 110, the flexible touchscreen 102, and a host 114 that may be coupled to each other through a bus. The electronic device 100 may be a smart phone, a GPS device, a tablet computer, a mobile media player, a laptop, a gaming system, a personal computer, or any other electronic device that may utilize a flexible touchscreen 102.

In various embodiments, host 114, may also be implemented as a system on chip and may comprise a processor, interface, circuitry, and/or the like configured to direct the flow of input and output data to the flexible touchscreen 102 and the associated touchscreen controller 110. A memory may be integrated onto the host 114. The memory may be programmed for short term and/or long term memory storage. The memory may comprise various programs to be executed in the host 114. The memory may include both volatile and non-volatile memories.

The touchscreen controller 110 may perform various methods with respect to the flexible touchscreen 102. In various embodiments, the touchscreen controller 110 may analyze information and carry out a series of firmware (FW) algorithms based on user input. In various embodiments, the touchscreen controller 110 may include, an analog block 111, a digital block 112 and a memory 113 operable by a processor. The analog block 111 may include a plurality of analog circuits configured to measure capacitances across the flexible touchscreen 102 and convert them into digital values. The digital block 112 may comprise a variety of digital logic circuits such as DACs or digital control systems configured to obtain digital touch data from the analog block 111, process the digital touch data and store them into memory 113. The touchscreen controller 110 may be a single integrated circuit capable of processing changes in capacitance from multiple portions of the flexible touchscreen 102 simultaneously.

In various embodiments, the memory 113 may be programmed for short term and/or long term memory storage. The memory 113 may be configured to store data generated by the touchscreen controller 110 and may comprise various programs to be executed in the touchscreen controller 110. For example, the memory 113 can store calibration data, touch detection algorithms, and other necessary information for the operation of the touchscreen controller 110. The memory 113 may include both volatile and non-volatile memories.

In one or more embodiments, the processor may comprise an application-specific integrated circuit (ASIC) device, a central processing unit (CPU), or an Advanced RISC Machine (ARM) core, or any other processing unit known in the art. In various embodiments, the touchscreen controller 110 may comprise a number of separate computing units such as cores integrated within one processor, or distinct separate processing chips.

The flexible touchscreen 102 is designed to register user input via touches made to its surface. The electronic device 100 may also be configured to detect input from the flexible touchscreen 102 that may also come from input given from a stylus (active or passive) device. In various embodiments, the flexible touchscreen 102 may include sensors such as gyroscopes or accelerometers. One or more of these sensors may be integrated together.

The host 114 may be configured to transmit image data to the flexible touchscreen 102 to be displayed on the flexible touchscreen 102 based on the folding angle θ. The folding angle θ may be transmitted by the touchscreen controller 110 to the host 114. In various embodiments, the touchscreen controller 110 may be configured to perform mutual and self-sensing scans to detect the amount of change in strength of mutual and self-capacitances and based thereon calculate and report the folding angle θ to the host 114.

Figure 4:
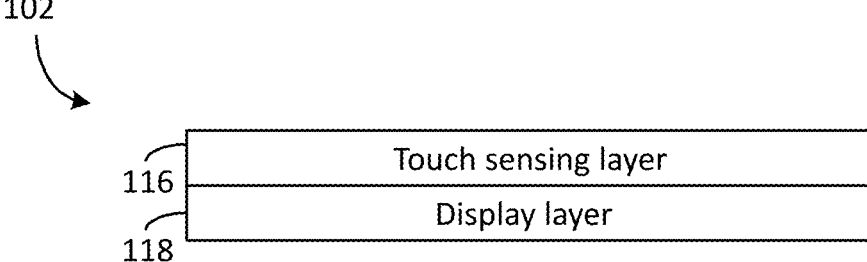
FIG. 4 illustrates a schematic of a flexible touchscreen according to an embodiment of the present application.

FIG. 4 illustrates a cross-section of a flexible touchscreen according to an embodiment of the present application. In various embodiments the flexible touchscreen 102 may include a touch sensing layer 116 and a display layer 118. The touch sensing layer 116 and the display layer 118 may be situated on the front facing side of the electronic device 100. The display layer 118 may comprise a light emitting diode (LED) display, organic LED display, LCD, AMOLED, or any other type of display.

In various embodiments, the touch sensing layer 116 may comprise force channels and sense channels that span the entirety of the flexible touchscreen 102 in a grid-like fashion that are operable by the touchscreen controller 110. In various embodiments, the force channels may be formed in columns across the flexible touchscreen 102 and the sense channels may be formed in rows across the flexible touchscreen 102 (or vice versa). In one or more embodiments, the force channels may be configured to drive and the sense channels may be configured to receive. In one or more embodiments, the sense channels may be configured to drive and the force channels may be configured to receive. The number of force and sense channels used are not limited by this application.

The force channels and the sense channels may overlap in certain embodiments. While various embodiments depict the force channels and the sense channels overlapping in an orthogonal manner, they may overlap other than orthogonally such as being interleaved or at various angles.

The force channels and the sense channels may have a measurable mutual capacitance at their intersections as to form a matrix of Tx electrodes and Rx electrodes across the flexible touchscreen 102. At each intersection point of a Tx and Rx electrode, a sensing node (or touch node) is formed. The sensing nodes can detect changes in capacitance caused by a user's touch, a user's proximity to the screen, and proximity of the sensing nodes on the first portion 104 and the sensing nodes on the second portion 106 of the screen. The channels of the first portion 104 and corresponding channels of the second portion 106 includes multiple sensing nodes. For example, the channels on the edge of the first portion 104 may include multiple sensing nodes, and the channels on the edge of the second portion opposite to the edge of the first portion 104 may include multiple sensing nodes. The sensing nodes within the channels of the first portion 104 and corresponding channels of the second portion 106 may be utilized to detect the folding state of the electronic device 100.

When the device is folded or unfolded, a distance between the channels of the first portion 104 and corresponding channels of the second portion 106 of the touchscreen causes changes in the capacitance values measured at these sensing nodes. The capacitance changes can determine the folding state of the electronic device 100. By monitoring the capacitance values of the sensing nodes on the first portion 104 and the second portion 106 of the touchscreen, the device can detect patterns that indicate opening, closing, or intermediate folding states.

The specific number and arrangement of sensing nodes in the touchscreen 102 may vary depending on the device's size and design. However, the principle of using these nodes for fold detection remains consistent across various implementations.

As appreciated by those with ordinary skill in the art, each of the force channels and the sense channels may also have a self-capacitance that is measurable. In other words, the force channels and the sense channels are operable in mutual sensing mode and a self-sensing mode. More information regarding the use of the facets of mutual sensing scans, and self-sensing scans to determine the folding angle θ of the flexible touchscreen 102 will be described further below.

Figure 5A:
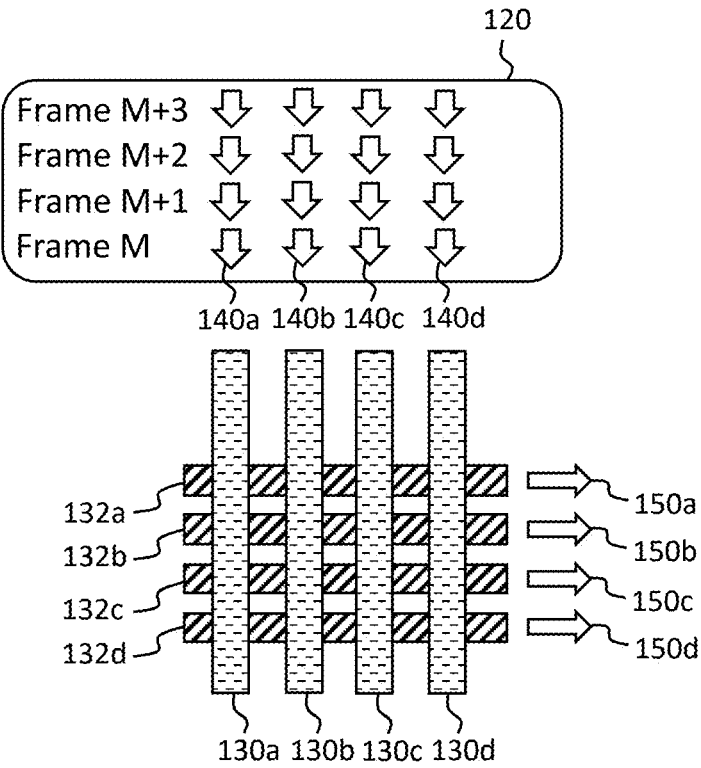
FIGS. 5A-5B illustrate schematic views of mutual sensing for an electronic device according to an embodiment of the present application.
Figure 5B:
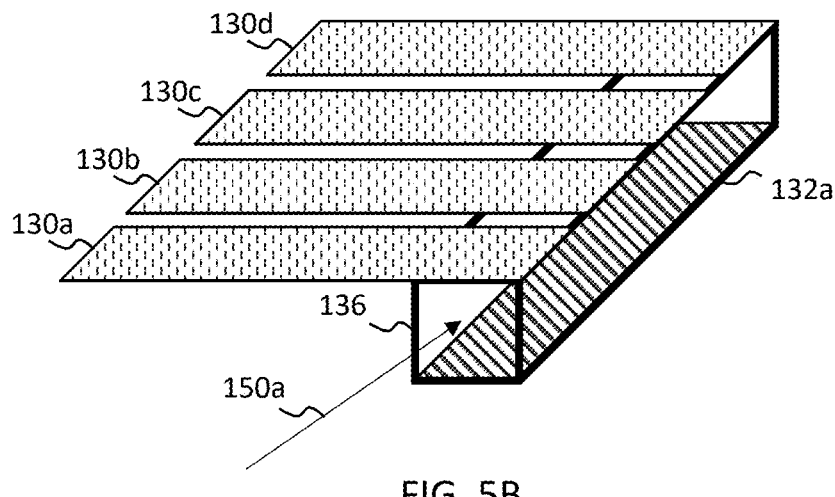

FIGS. 5A-5B illustrate schematic views of mutual sensing for an electronic device according to an embodiment of the present application. FIG. 5A shows a grid-like structure representing the sensing arrangement, with force channels 130 (including, e.g., 130a, 130b, 130c, and 130d) intersecting with sense channels 132 (including, e.g., 132a, 132b, 132c, and 132d). The force channels 130 are arranged perpendicular to the sense channels 132. For example, the force channels 130 may extend vertically across the entire length of the touch sensing layer 116 to transmit drive signals and the sense channels 132 may extend horizontally across the entire width of the touch sensing layer 116 to receive and measure the capacitive coupling from the force channels 130. This orthogonal arrangement allows for the detection of touch points at the intersections of these channels.

FIG. 5A includes frame 120 is shown to contain multiple frames, Frame M, Frame M+1, Frame M+2, and Frame M+3. The specific number of frames may vary depending on the device's size and design. During each frame, multiple force channels 130 are simultaneously driven as shown by arrow 140 (including, e.g., 140*a*, 140*b*, 140*c*, and 140*d*). The mutual sensing technique of simultaneously driving multiple channels may be referred to as gangscan sense or gangscan force.

In gangscan sense or gangscan force, selected multiple channels are driven together simultaneously. The selected multiple channels to be driven simultaneously may be all force channels, some force channels, all sense channels, or some sense channels. For example, as shown in FIG. 5A, the force channels 130*a*, 130*b*, 130*c*, and 130*d* are simultaneously driven as shown by the arrows representing the scans 140*a*, 140*b*, 140*c*, and 140*d* during each of Frame M, Frame M+1, Frame M+2, Frame M+3, and so on.

In an embodiment, when multiple force channels are driven simultaneously, the sense channels 132 receive signals 150 that represent a change in mutual capacitances across multiple intersections at once. This simultaneous scan allows the system to measure the mutual capacitances at multiple intersection points at the same time.

In various embodiments, gangscan sensing may provide advantages in terms of speed and power efficiency compared to traditional mutual sensing. By driving multiple force channels simultaneously, the system can collect mutual capacitance data more quickly and with fewer scanning cycles, which may lead to improved responsiveness and reduced power consumption in touchscreen devices.

FIG. 5B provides a three-dimensional representation of the gangscan sensing discussed in FIG. 5A. FIG. 5B shows a three-dimensional representation of force channels 130, a sense channel 132*a*, and an intersection point 134 that illustrates the interaction between force channel 130*a* and the sense channel 132*a* as described in FIG. 5A.

As described in FIG. 5A, the force channels 130*a*, 130*b*, 130*c*, and 130*d* are driven simultaneously and the sense channel 132*a* receive signals 150*a* at the intersection point 136. The intersection point 136 between force channels 130*a*, 130*b*, 130*c*, and 130*d* and sense channel 132*a* represents the area where mutual capacitance is measured. In contract with intersection point 134 of FIG. 6B, the intersection point 136 spans the length of the sense channel 132*a*. In various embodiments, when multiple force channels are driven together, the sense channel 132*a* can receive signals 150 at multiple intersections across the sense channel simultaneously. The system can measure the mutual capacitance across all intersection points in a single frame scan.

Figure 6A:
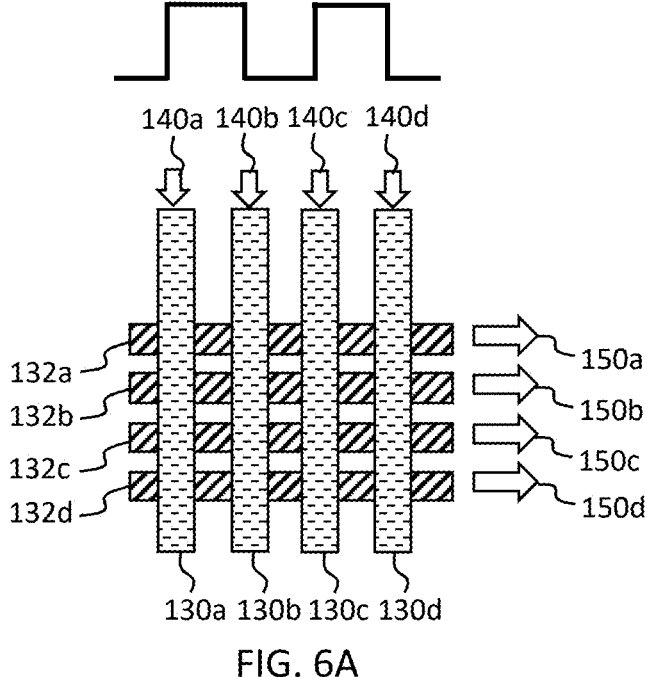
FIGS. 6A-6B illustrate schematic views of mutual sensing according to an embodiment of the present application.
Figure 6B:
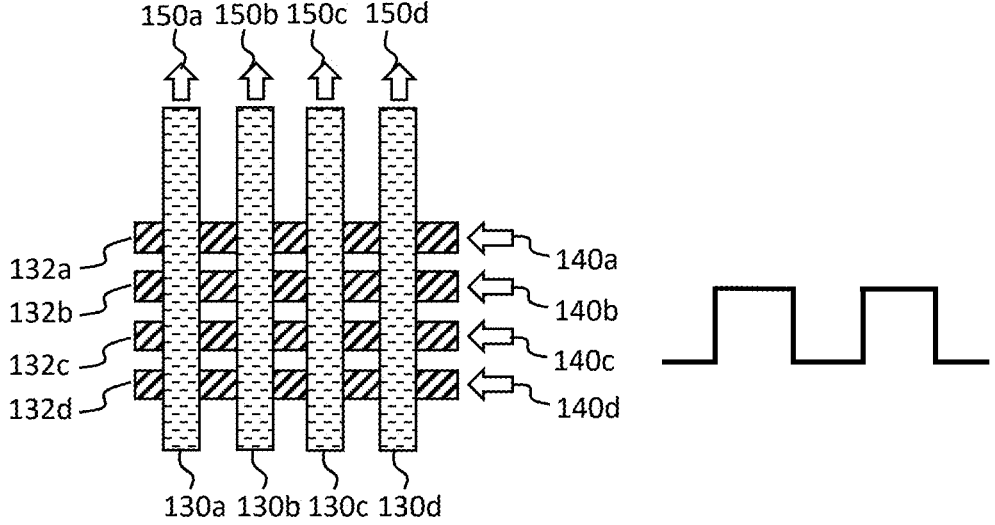

FIGS. 6A-6B illustrate schematic views of mutual sensing according to an embodiment of the present application. FIGS. 6A-6B will be described in conjunction with the gangscan sensing method discussed in FIGS. 5A-5B.

FIG. 6A shows one configuration where all force channels 130*a*, 130*b*, 130*c*, and 130*d* are driven simultaneously as shown by the arrows representing the scans 140*a*, 140*b*, 140*c*, and 140*d* at each force channel. This configuration may be referred to as gangscan sense. The sense channels 132*a*, 132*b*, 132*c*, and 132*d* receive signals 150*a*, 150*b*,

150*c*, and 150*d* that represent the mutual capacitance at each intersection across the touch sensing layer 116.

FIG. 6B shows another configuration where all sense channels 132*a*, 132*b*, 132*c*, and 132*d* are driven simultaneously as shown by the arrows representing the scans 140*a*, 140*b*, 140*c*, and 140*d* at each sense channel. This configuration may be referred to as gangscan force. The force channels 130*a*, 130*b*, 130*c*, and 130*d* receive signals 150*a*, 150*b*, 150*c*, and 150*d* that represent the mutual capacitance at each intersection across the touch sensing layer 116.

The force channels and sense channels may be configured to drive or receive based on the orientation of the electronic device 100. For example, when the flexible touchscreen 102 is configured to be rotated across its length or in fold mode as shown in FIGS. 2A-2B (i.e., the hinge 108 is parallel to the force channels), the force channels may be configured to drive and the sense channels may be configured to receive as shown in FIG. 6A. In another example, when the flexible touchscreen 102 is configured to be rotated across its width or in flip mode as shown in FIGS. 3A-3B (i.e., the hinge 108 is parallel to the sense channels), the sense channels may be configured to drive and the force channels may be configured to receive as shown in FIG. 6B.

Figure 7A:
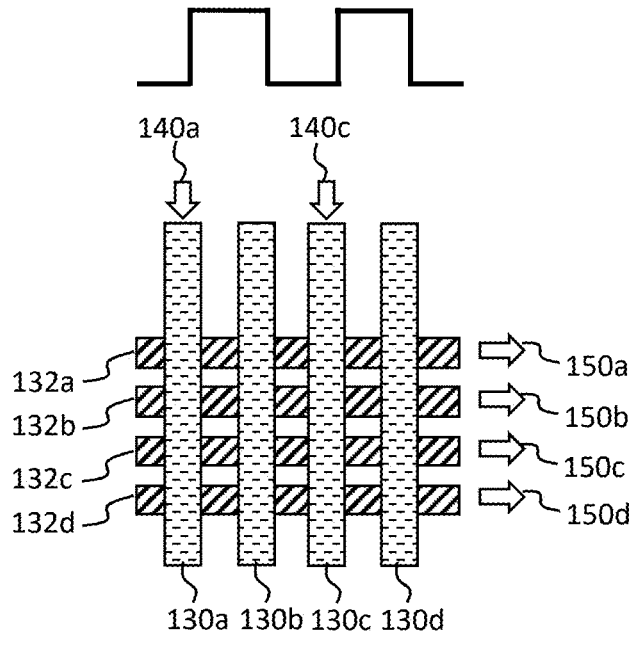
FIGS. 7A-7B illustrate schematic views of mutual sensing according to an embodiment of the present application.
Figure 7B:
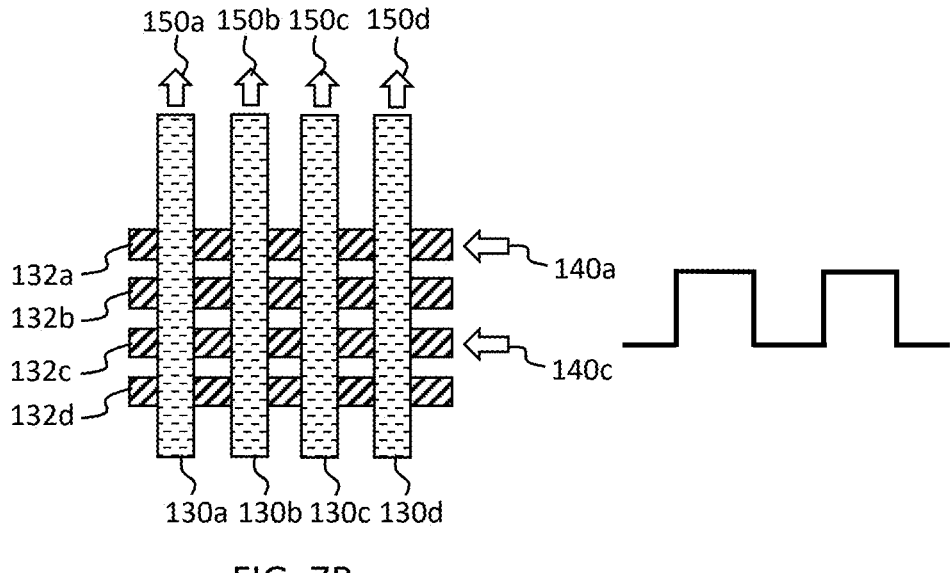

FIGS. 7A-7B illustrate schematic views of mutual sensing according to an embodiment of the present application. FIGS. 7A-7B will be described in conjunction with the gangscan sensing method discussed in FIGS. 5A-5B.

FIG. 7A shows one configuration where alternating force channels 130*a* and 130*c* are driven simultaneously as shown by the arrows representing the scans 140*a* and 140*c* at each selected force channel. This configuration may be referred to as gangscan sense interlaced. The sense channels 132*a*, 132*b*, 132*c*, and 132*d* receive signals 150*a*, 150*b*, 150*c*, and 150*d* that represent the mutual capacitance at the intersections of the selected force channels 130 and the sense channels 132 across the touch sensing layer 116.

FIG. 7B shows another configuration where alternating sense channels 132*a* and 132*c* are driven simultaneously as shown by the arrows representing the scans 140*a* and 140*c* at each selected sense channel. This configuration may be referred to as gangscan force interlaced. The force channels 130*a*, 130*b*, 130*c*, and 130*d* receive signals 150*a*, 150*b*, 150*c*, and 150*d* that represent the mutual capacitance at each intersection of the selected sense channels 132 and the force channels 130 across the touch sensing layer 116.

In various embodiments, interlaced gangscan sensing may offer advantages in noise reduction and spatial resolution. By driving alternating channels simultaneously, these approaches can potentially mitigate interference between adjacent channels while maintaining efficient data collection.

Figure 8A:
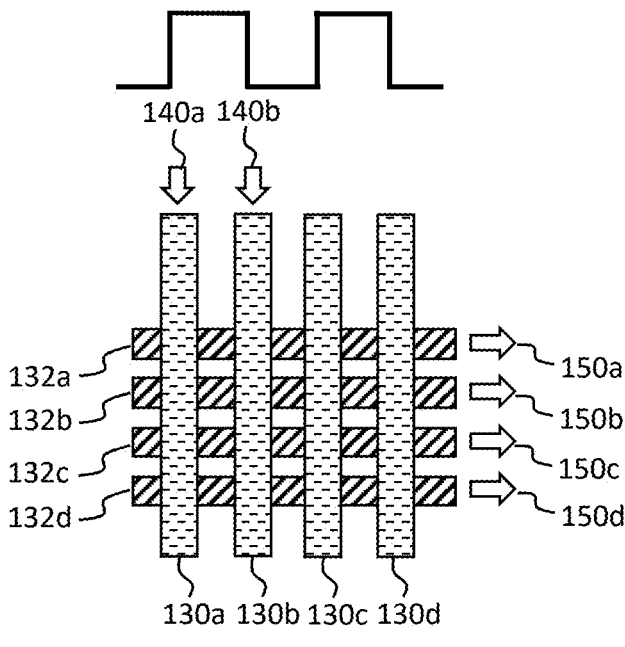
FIGS. 8A-8B illustrate schematic views of mutual sensing according to an embodiment of the present application.
Figure 8B:
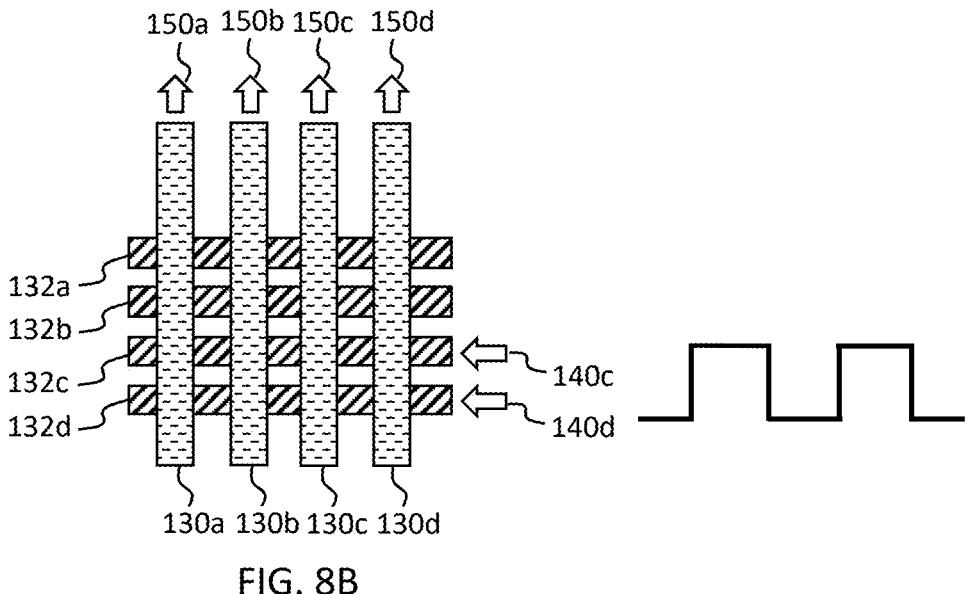

FIGS. 8A-8B illustrate schematic views of mutual sensing according to an embodiment of the present application. FIGS. 8A-8B will be described in conjunction with the gangscan sensing method discussed in FIGS. 5A-5B.

FIG. 8A shows one configuration where partial force channels 130*a* and 130*b* are driven simultaneously as shown by the arrows 140*a* and 140*b* at each selected force channel. This configuration may be referred to as gangscan sense partial. The sense channels 132*a*, 132*b*, 132*c*, and 132*d* receive signals 150*a*, 150*b*, 150*c*, and 150*d* that represent the mutual capacitance at the intersections of the selected force channels 130 and the sense channels 132 across the touch sensing layer 116.

FIG. 8B shows another configuration where alternating sense channels 132*a* and 132*b* are driven simultaneously as shown by the arrows representing the scans 140*a* and 140*b* at each selected sense channel. This configuration may be referred to as gangscan force partial. The force channels 130a, 130b, 130c, and 130d receive signals 150a, 150b, 150c, and 150d that represent the mutual capacitance at each intersection of the selected sense channels 132 and the force channels 130 across the touch sensing layer 116.

While FIGS. 8A and 8B show a pair of neighboring channels being driven simultaneously, any combination of multiple channels may also be selected. For example, force channels 130a and 130d may also be selected, or force channels 130a, 130c, and 130d may be selected. In various embodiments, partial gangscan sensing may offer advantages in power efficiency and targeted scanning compared to full-array driving. By driving selected channels simultaneously, these approaches can potentially focus sensing resources on areas of interest or adapt to specific touch patterns.

The various gangscan configurations shown in FIGS. 6A-6B, 7A-7B, and 8A-8B can allow for adaptable touch detection strategies, suitable for different device form factors, usage scenarios, or power management requirements.

Figure 9A:
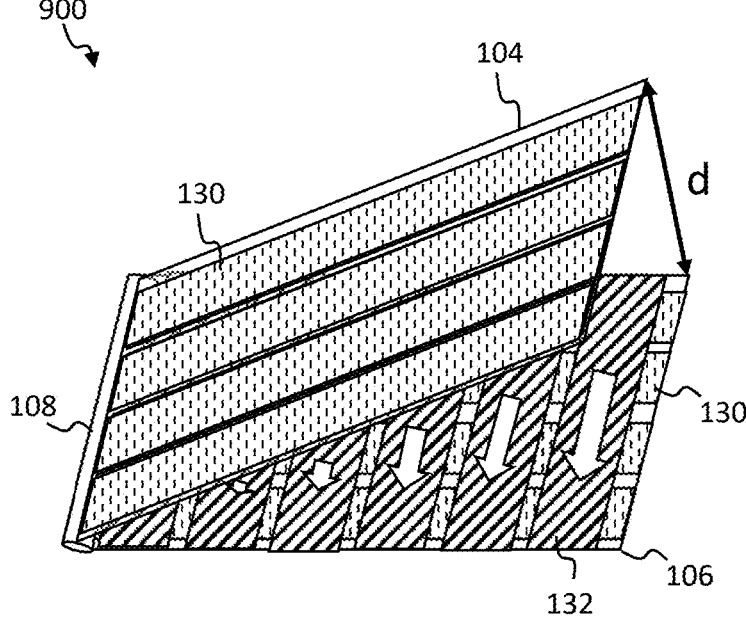
FIGS. 9A-9B illustrate a sensing arrangement for an electronic device according to an embodiment of the present application.
Figure 9B:
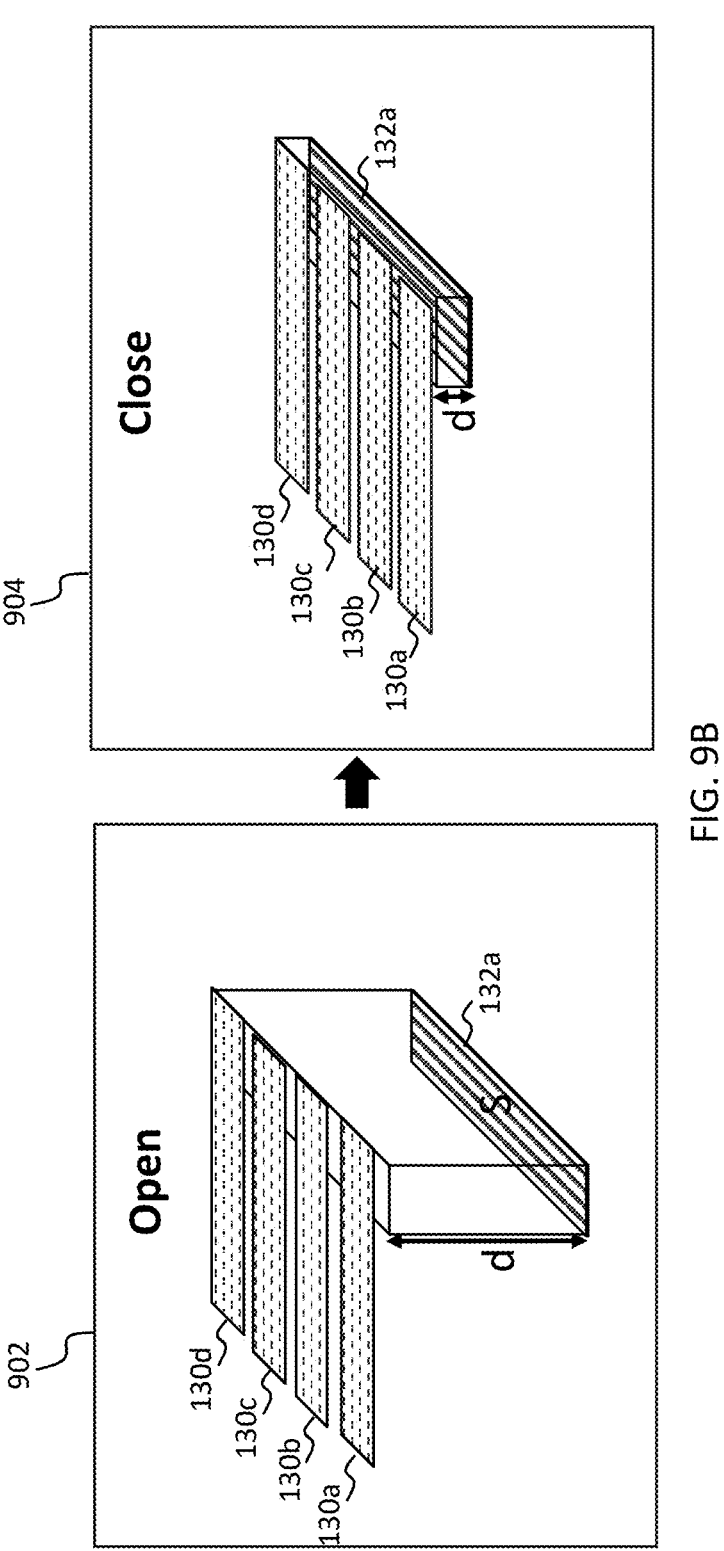
Figure 10A:
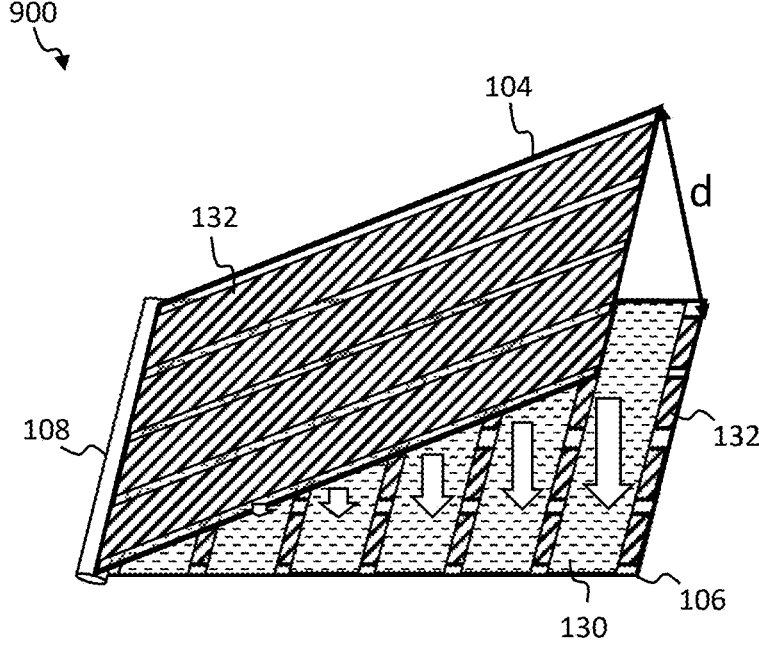
FIGS. 10A-10B illustrate a sensing arrangement for an electronic device according to an embodiment of the present application.

FIGS. 9A-9B and 10A-10B illustrate a sensing arrangement for an electronic device according to an embodiment of the present application. FIGS. 9A and 10A shows a sensing arrangement 900 for a foldable electronic device. In various embodiments, the foldable electronic device includes a hinge 108 that connects a first portion 104 and a second portion 106 of a touchscreen.

In various embodiments, the first portion 104 of the device is configured to be rotated along the hinge 108 towards the second portion 106 of the device. The sensing arrangement 900 include force channels 130 and sense channels 132. In one or more embodiments, the force channels 130 are in a length direction perpendicular to the hinge 108 and the sense channels 132 are in a width direction parallel to the hinge 108 as shown in FIGS. 9A-9B. This configuration may be known as flip mode as shown in FIGS. 2A-2B.

Figure 10B:
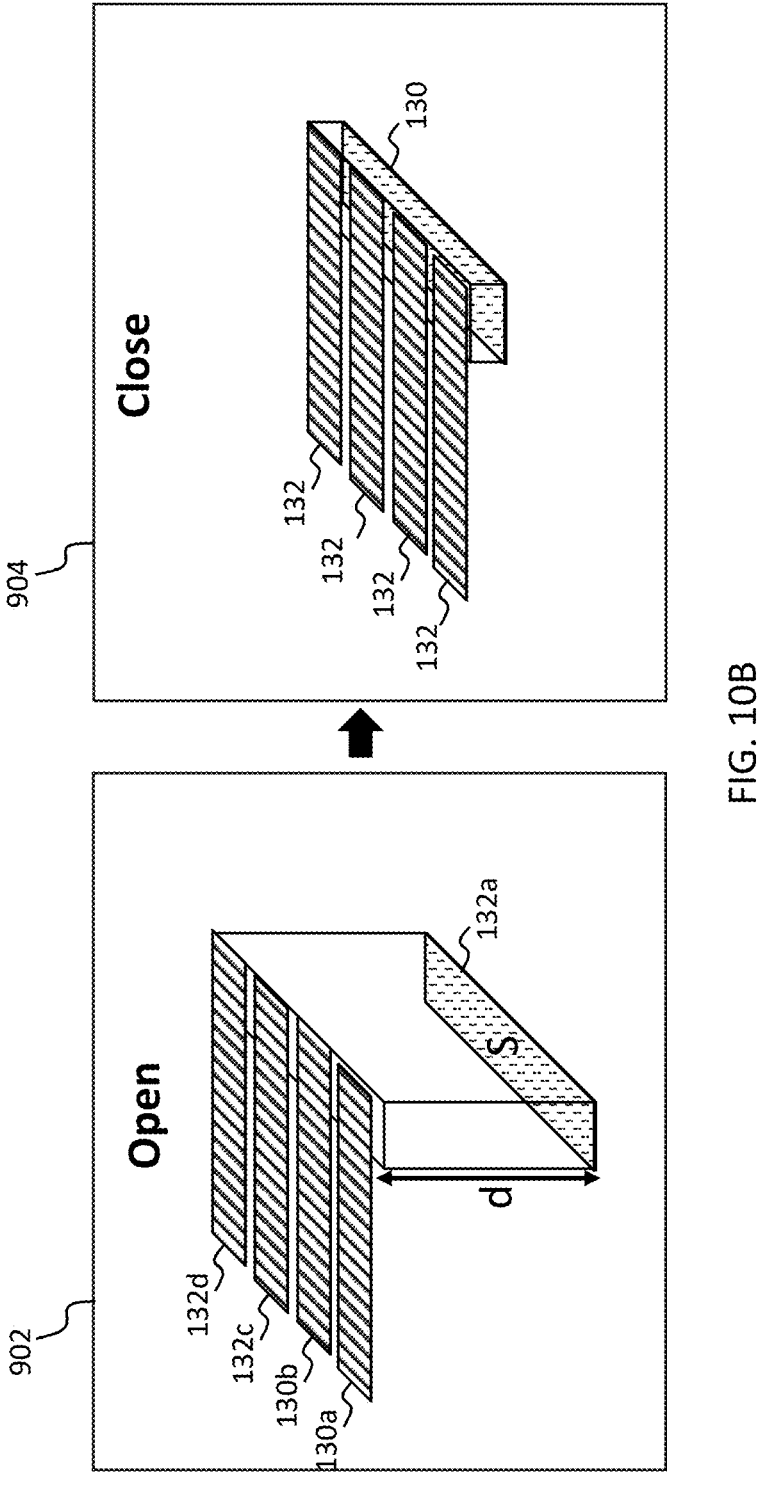

In other embodiments, the force channels 130 are in a length direction parallel to the hinge 108 and the sense channels 132 are in a width direction perpendicular to the hinge 108 as shown in FIGS. 10A-10B. This configuration may be known as fold mode as shown in FIGS. 1A-1B. The folding state of the device can be detected by measuring changes in mutual capacitances between the force channels and the sense channels as the first portion 104 is rotated towards or away from the second portion 106.

In one or more embodiments, multiple force channels 130 can be simultaneously driven to measure the mutual capacitance at the intersections of the sense channels 132. In one or more embodiments, the selected multiple force channels 130 may include all force channels as described in FIG. 6A, interleaved force channels as described in FIG. 7A, or partial force channels as described in FIG. 8A. In other embodiments, multiple sense channels 132 can be simultaneously driven to measure the mutual capacitance at the intersections of the force channels 130. The selected multiple sense channels 132 may include all sense channels as described in FIG. 6B, interleaved sense channels as described in FIG. 7B, or partial sense channels as described in FIG. 8B.

In one or more embodiments, a distance d can be determined between the first portion 104 and the second portion 106 based on the mutual capacitance received by the sense channels 132. In some embodiments, the distance d may be determined at the outer edges opposite from the hinge. The distance d can be used to determine when the device is folded or unfolded. As the device is folded or unfolded, the mutual capacitances at the intersection of the selected force channels 130 and the sense channels 132 change. This change in the mutual capacitance corresponds to the distance d between the first portion 104 and the second portion 106. In various embodiments, the mutual capacitance is inversely proportional to the distance d. For example, as the device is folding and the two portions of the touchscreen get closer together, the mutual capacitance increases. Conversely, as the device is unfolding and the two portions of the touchscreen get further apart, the mutual capacitance decreases. By monitoring these changes in mutual capacitance, the touchscreen controller 110 can determine the folding state of the device.

FIG. 9B shows an alternate view of the force channels 130 and a sense channel 132a for a foldable device in an open state 902 and a closed state 904. In the open state 902, the distance d between the force channels 130 of the first portion 104 of the touchscreen and the sense channels 132 of the second portion 106 of the touchscreen is larger than the distance d in the closed state 904. In the closed state 904, the distance between the force channels 130 of the first portion 104 and sense channels 132 of the second portion 106 is smaller compared to the open state 902. For example, the distance d in the open state 902 may be 1 mm or greater, and the distance d in the closed state 904 may be 0 mm to 1 mm depending on the gap between the two portions of the flexible touchscreen 102.

As the device transitions between open and closed states, the changing distance d between these channels results in corresponding changes in the measured mutual capacitance. The capacitance can be calculated using the formula $C = s/4\pi kd$, where C is a capacitance, S is a surface area, k is Coulomb's constant, and d is the distance. Consequently, the mutual capacitance between the channels in the open state 902 is smaller than the mutual capacitance in the closed state 904. In other words, the larger distance results in a smaller mutual capacitance between the channels and the smaller distance results in a larger mutual capacitance between the channels. Thus, the mutual capacitance between these channels increases as the folding state changes from open to closed. By using the gangscan technique, the capacitance can be collected by the touchscreen controller 110 as raw data where the raw data corresponds to the distance d, and the distance d can determine the open or close state of the device.

Figure 11:
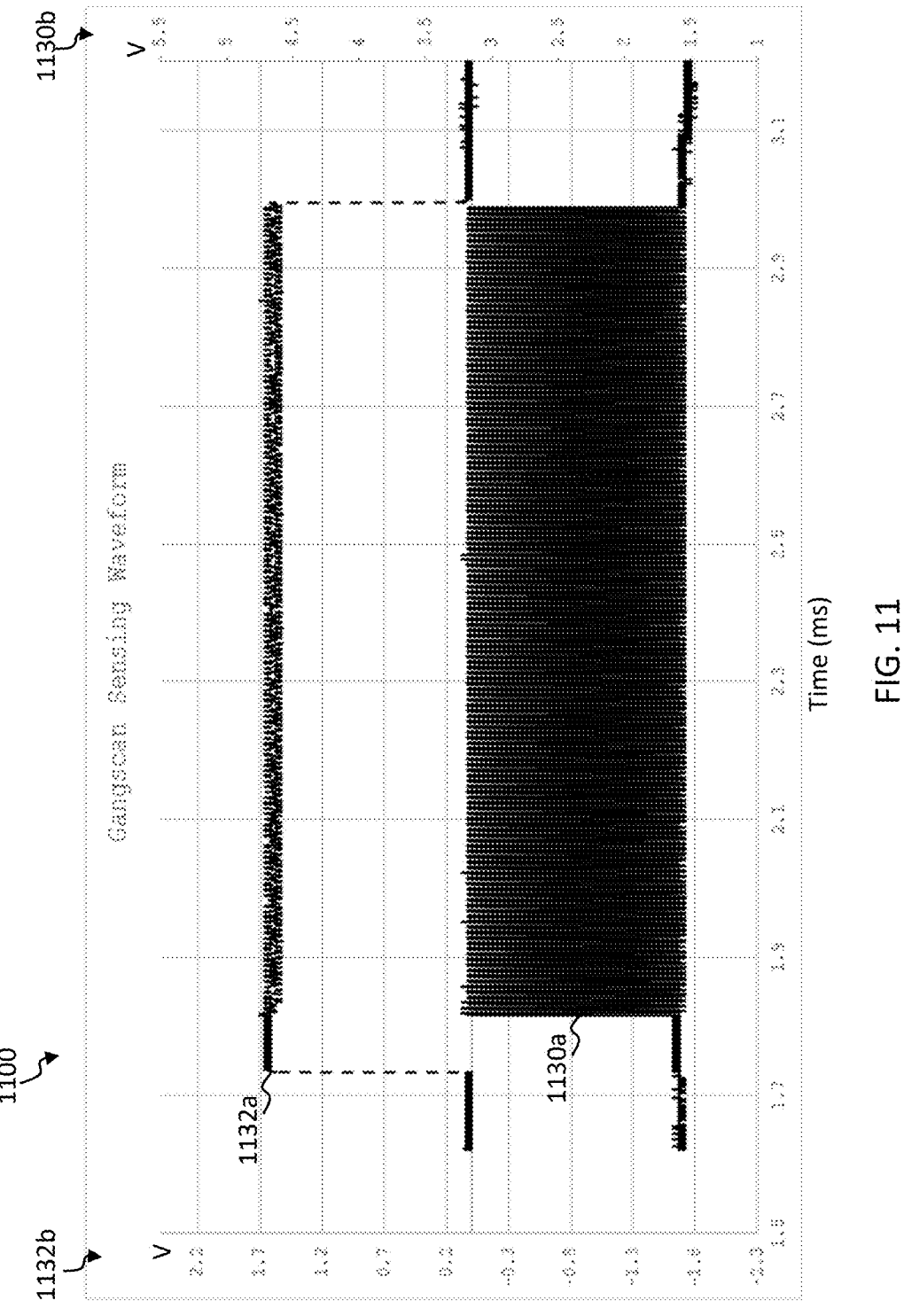
FIG. 11 illustrates waveform characteristics for gangscan scanning according to an embodiment of the present application.

FIG. 11 illustrates waveform characteristics for gangscan scanning according to an embodiment of the present application. The graph 1100 illustrates a sample representation of a drive channel signal 1130a and a receive channel signal 1132a used in gangscan scanning. The drive channel signal 1130a corresponds to the drive channel axis 1130b and the receive channel signal 1132a corresponds to the receive channel signal 1132b.

In various embodiments, gangscan scanning can utilize different waveform shapes, including but not limited to, square wave, triangle wave, or sine wave. These waveforms are applied to the drive channels and measured on the receive channels to determine the mutual capacitance between the intersections of the channels. In one or more embodiments, the drive channel may be force channels and the receive channels may be sense channels. In one or more embodiments, the drive channel may be sense channels and the receive channel may be force channels. The gangscan drive channel signal 1130a represents the waveform applied to multiple drive channels simultaneously, while the gangscan receive channel signal 1132a shows the resulting response measured on the corresponding receive channels.

In one or more embodiments, the dynamic range of the gangscan signals may span from oV to 9V. This voltage range may provide sufficient signal amplitude to detect capacitive changes while remaining within the operational limits of the touchscreen controller 110. The sensing frequency for gangscan operation may range from 50 kHz to 500 kHz. This frequency range rapidly samples the capacitive changes that occur as the device is folded or unfolded.

Figure 12A:
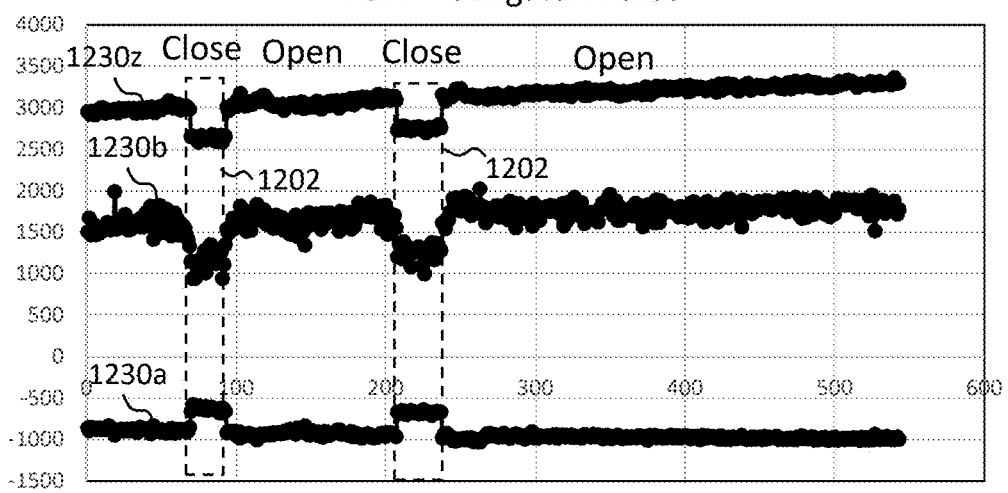
FIGS. 12A-12B illustrate gangscan force raw data for an electronic device according to an embodiment of the present application.
Figure 12B:
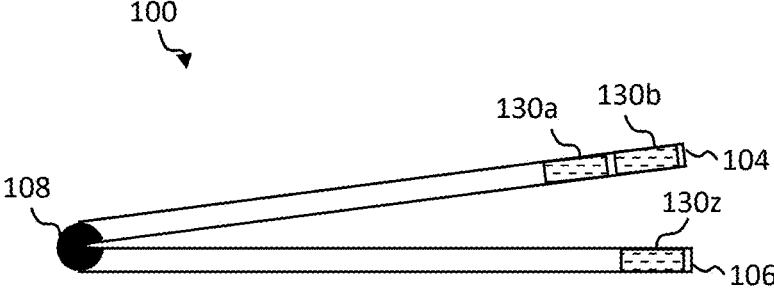

FIGS. 12A-12B illustrate gangscan force raw data for an electronic device according to an embodiment of the present application. FIG. 12A shows an exemplary graph 1200 for raw data collected from a gangscan force method according to an embodiment of the present application. FIG. 12B shows a schematic representation of force channels 130 (including, e.g., 130a, 130b, and 130z) on an edge of an electronic device 100 according to an embodiment of the present application.

FIG. 12A shows plot lines 1230 for raw data received over a number of frames by force channels 130 from a gangscan force scan. The x-axis represents time or number of frames and the y-axis represents the capacitance values. The graph 1200 shows plot lines 1230 (including, e.g., 1230a, 1230b, and 1230z) that correspond to the force channels 130 in FIG. 12B. The plot line 1230a corresponds to the force channel 130a on the first portion 104 of the device, the plot line 1230b corresponds to the force channel 130b on the first portion 104 of the device, and the plot line 1230z corresponds to the force channel 130z on the second portion 106 of the device.

In various embodiments, the force channels 130 may use differential scanning or single-ended scanning. For example, in FIGS. 12A-12B, the force channels 130a and 130z utilize differential scanning, while the force channel 130b utilizes a single-ended scanning. Differential scanning measures a difference between two signals or channels by comparing the signal from one channel to a reference channel or to another channel. Differential scanning offers improved noise rejection, better sensitivity, and reduced impact of environmental factors. In various embodiments, differential scanning can be used to detect small changes in capacitance and maintain accuracy in challenging environments. Single-ended scanning measures the absolute value of a signal on a single channel against a fixed reference or ground. Single-ended scanning may use less power and may provide faster scanning. In one or more implementations, both differential scanning and single-ended scanning may be utilized.

As the electronic device 100 opens or closes, the distance between the channels on the first portion 104 and the second portion 106 of the device changes. The change in distance results in a change in mutual capacitance which can be detected by the raw data. The transitions in the plot lines 1230 correspond to the device rotating between open and closed states, while the stable regions of the plot lines 1230 correspond to when the device maintains its current position. For example, as shown by an outline 1202 in FIG. 12A, the raw data for force channels 130b (i.e., plot line 1230b) and 130z (i.e., plot line 1230z) decrease as the device is closing and the raw data (i.e., plot line 1230a) for the force channel 130a increases. Both differential scanning and single-ended scanning show the raw data changing which can be used to detect when the folding state is open or closed.

While FIG. 12B shows the plot lines 1230 for force channels 130 located at an edge of the first portion and the second portion of the device, other force channels 130 of the first portion and the second portion of the device may also be utilized.

Figure 13A:
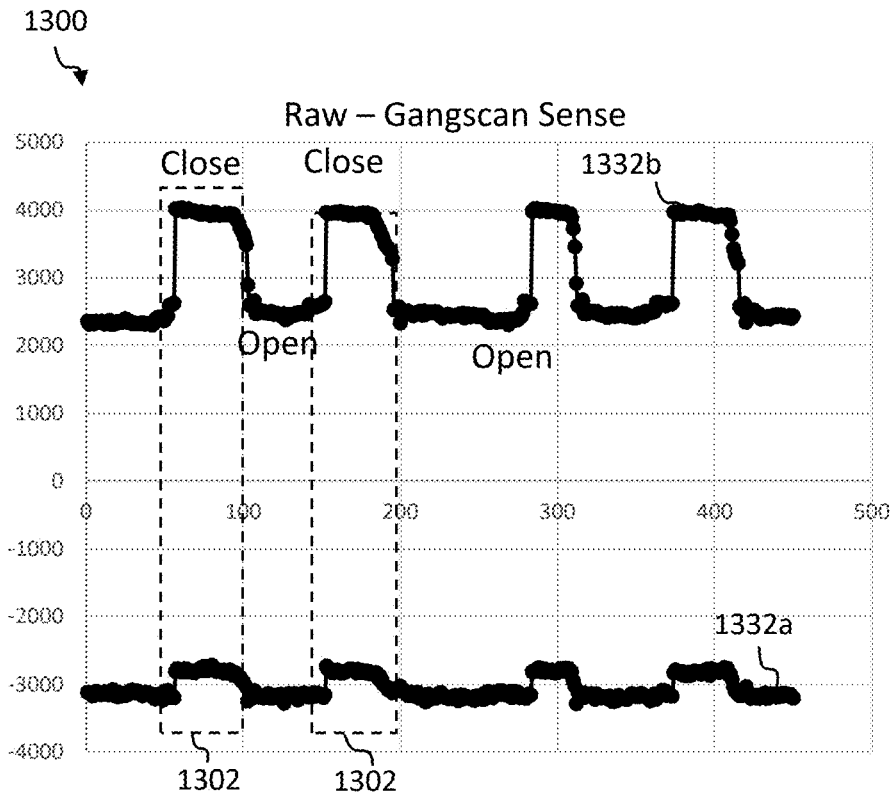
FIGS. 13A-13B illustrate gangscan sense raw data an electronic device according to an embodiment of the present application.
Figure 13B:
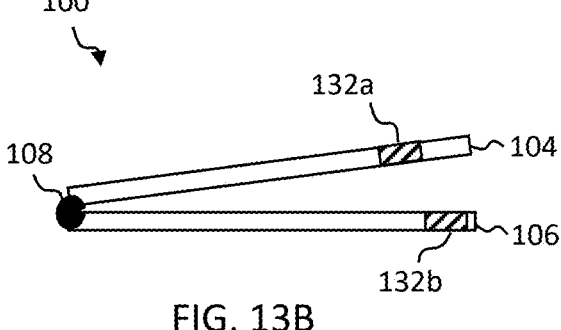

FIGS. 13A-13B illustrate gangscan sense raw data for an electronic device according to an embodiment of the present application. FIG. 13A shows an exemplary graph 1300 for raw data collected from a gangscan sense method according to an embodiment of the present application. FIG. 13B shows a schematic representation of sense channels 132 (including, e.g., 132a and 132b) on an edge of an electronic device 100 according to an embodiment of the present application.

FIG. 13A shows plot lines 1332 for raw data received over a number of frames by sense channels 132 from a gangscan sense scan. The x-axis represents time or number of frames and the y-axis represents the capacitance values. The graph 1300 shows plot lines 1332 (including, e.g., 1332a and 1332b) that correspond to the sense channels 132 in FIG. 13B. The plot line 1332a corresponds to the sense channel 132a on the first portion 104 of the device and the plot line 1332b corresponds to the sense channel 132b on the second portion 106 of the device.

As the electronic device 100 opens or closes, the distance between the channels on the first portion 104 and the second portion 106 of the device changes. The change in distance results in a change in mutual capacitance which can be detected by the raw data. The transitions in the plot lines 1332 correspond to the device rotating between open and closed states and the stable regions of the plot lines 1332 correspond to when the device maintains its current position. For example, as shown by an outline 1302 in FIG. 13A, the raw data (i.e., plot lines 1332) for the sense channel 132a and 132b increases when the device closes. While FIG. 13B shows the plot lines 1332 for sense channels 132 located near an edge of the first portion and the second portion of the device, other sense channels 132 on the first portion and the second portion of the device may also be utilized.

Figure 14:
FIG. 14 illustrates a flowchart for determining a folding state of a foldable device according to an embodiment of the present application.
Figure 14:
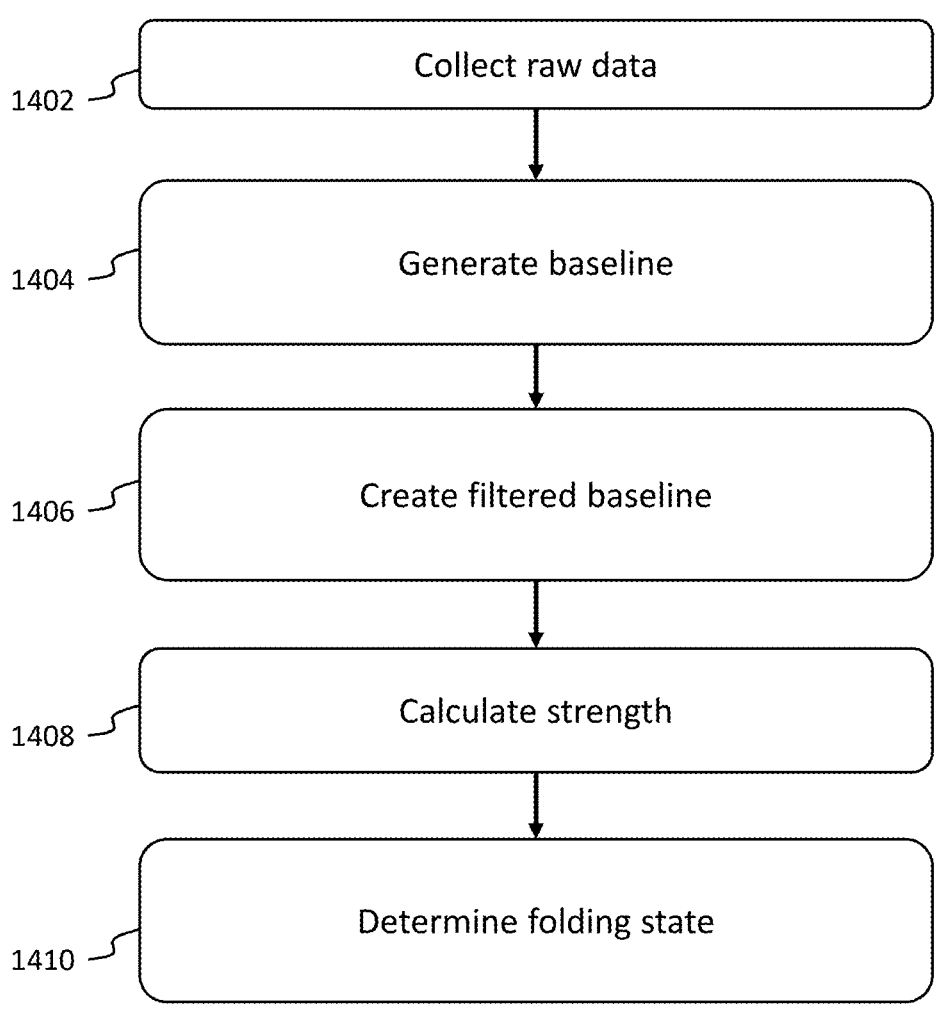

FIG. 14 illustrates a flowchart for determining a folding state of a foldable device according to an embodiment of the present application.

The process 1400 begins by collecting raw data in step 1402. The raw data can be obtained by the touchscreen controller 110 from capacitive sensors that correspond to receive channels. The raw data represents the capacitance measurements on a first portion of the device and the capacitance measurements on a second portion of the device. In various embodiments, the capacitance measurements may be located near an edge of the first portion and an opposing edge of the second portion of the foldable device. The capacitance measurements on the first portion and the second portion of the device changes as the device is opening or closing.

Following step 1402, the process 1400 continues to generate a baseline in step 1404. The baseline is generated based on the collected raw data and a current folding state (i.e., open or closed) of the device. When the current folding state is open, the generated baseline is equal to the collected raw data. When the current folding state is closed, the generated baseline is equal to the collected raw data and an offset. The offset represents a difference between the capacitance measurements when the folding state is closed and the capacitance measurements when the folding state is open.

Following step 1404, the process 1400 continues to create a filtered baseline in step 1406. In various embodiments, the filtered baseline is created from the generated baseline. In one or more embodiments, an infinite impulse response (IIR) filter may be applied to the generated baseline to create the filtered baseline. The IIR filter may be a low-pass filter, for example, a Butterworth filter. The IIR filter can be applied to smooth out rapid fluctuations in the generated baseline. The fluctuations may occur due to various factors such as changes in the device's position, temperature shifts, environmental noise, or small variations in the capacitive sensing. The filtered baseline provides a stable baseline for subsequent calculations by smoothing out rapid fluctuations in the raw data.

Following step 1406, the process 1400 continues to calculate strength data in step 1408. The strength data is calculated based on the filtered baseline in step 1406 and the collected raw data in step 1402. In various embodiments, the strength data is calculated by subtracting the collected raw data from the filtered baseline. In other words, the strength data is a difference between the collected raw data and the filtered baseline. The magnitude of the strength data may be used to determine the folding state of the device.

Following step 1408, the process 1400 continues to determine the folding state in step 1410. The folding state includes an open state and a closed state. In various embodiments, the folding state is determined by comparing the calculated strength data to a predetermined threshold. The predetermined threshold may be set to 200, for example. When the strength data is greater than the predetermined threshold, the folding state is determined to be in the closed state. When the strength data is less than or equal to the predetermined threshold, the folding state is determined to be in the open state.

In some embodiments, the folding state is determined based on a previous folding state and the calculated strength data compared to a predetermined low threshold and a predetermined high threshold. When the calculated strength data reaches the predetermined low threshold or the predetermined high threshold, the folding state changes from the previous folding state. For example, the folding state changes to an open state when the previous folding state is in a closed state, and the folding state changes to the closed state when the previous folding state is in the open state. As a specific example, when the previous folding state is in the open state and the calculated strength data is greater than or equal to the predetermined high threshold or less than or equal to the predetermined low threshold, the folding state is determined to be in the closed state. Similarly, when the previous folding state is in the closed state and the calculated strength data is greater than or equal to the predetermined high threshold or less than or equal to the predetermined low threshold, the folding state is determined to be in the open state.

When the calculated strength data does not reach the predetermined low threshold or the predetermined high threshold, the folding state remains in the previous folding state. For example, when the previous folding state is in the closed state and the calculated strength data is greater than the predetermined low threshold and less than the predetermined high threshold, the folding state remains in the closed state. Similarly, when the previous folding state is in the open state and the calculated strength data is greater than the predetermined low threshold and less than the predetermined high threshold, the folding state remains in the open state.

Figure 15:
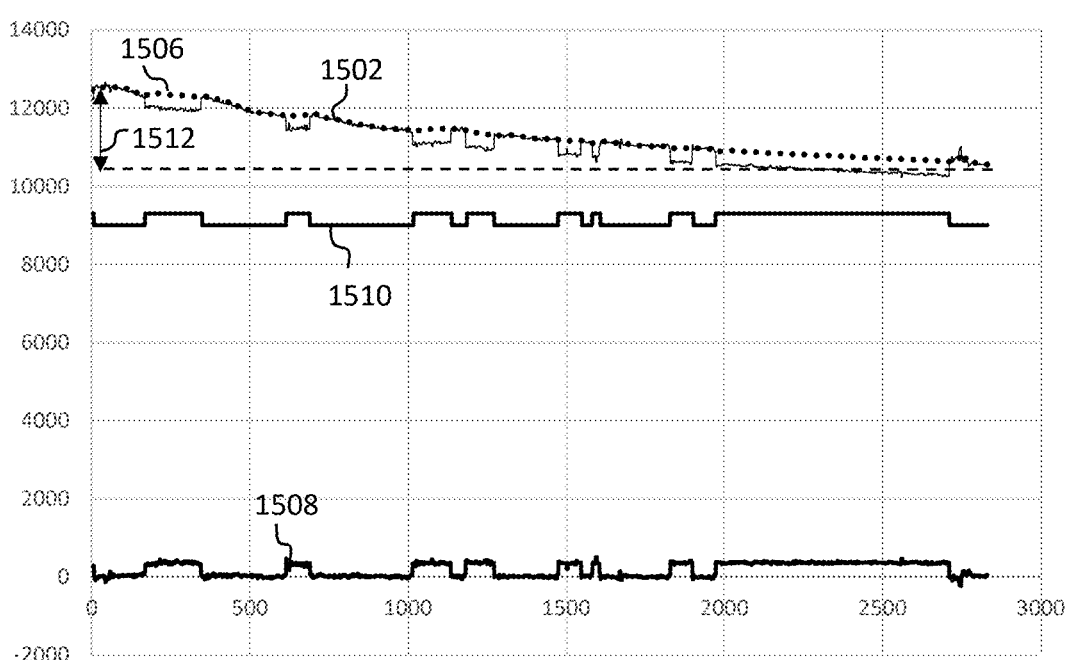
FIG. 15 illustrates a graph for determining a folding state of a device according to an embodiment of the present application.

FIG. 15 illustrates a graph for determining the folding state of a device according to an embodiment of the present application. FIG. 15 will be described in conjunction with FIG. 14. The graph 1500 shows multiple data series over time or over frame measurements. Each data series represents a different step in the process 1400. The x-axis represents time or number of frames and the y-axis represents a magnitude for various measurements.

The data series 1502 represents the raw data collected by the touch controller in step 1402. The raw data 1502 may fluctuate due to various factors such as temperature shifts, environmental noise, or small variations in the capacitive sensing. The arrow 1512 shows a magnitude of change in the raw data 1502 over time. The data series 1506, partially overlapping data series 1502, represents a filtered baseline created in step 1406. The filtered baseline 1506 tracks the raw data which slowly changes as temperature is changing to provide a stable baseline for the subsequent strength data calculation. The data series 1508 represents the strength data calculated in step 1408 which can be used to determine the folding state. The data series 1510 represent the folding states determined in step 1410 based on the strength data in data series 1508.

The graph 1500 illustrates the relationship between these different data series. For instance, when the raw data 1502 diverges from the filtered baseline 1506, a corresponding change in the strength data 1508 and change in folding state or open/close state 1510 can be observed. This visual representation demonstrates how the raw data is processed and interpreted to determine changes in the device's folding state.

Figure 16:
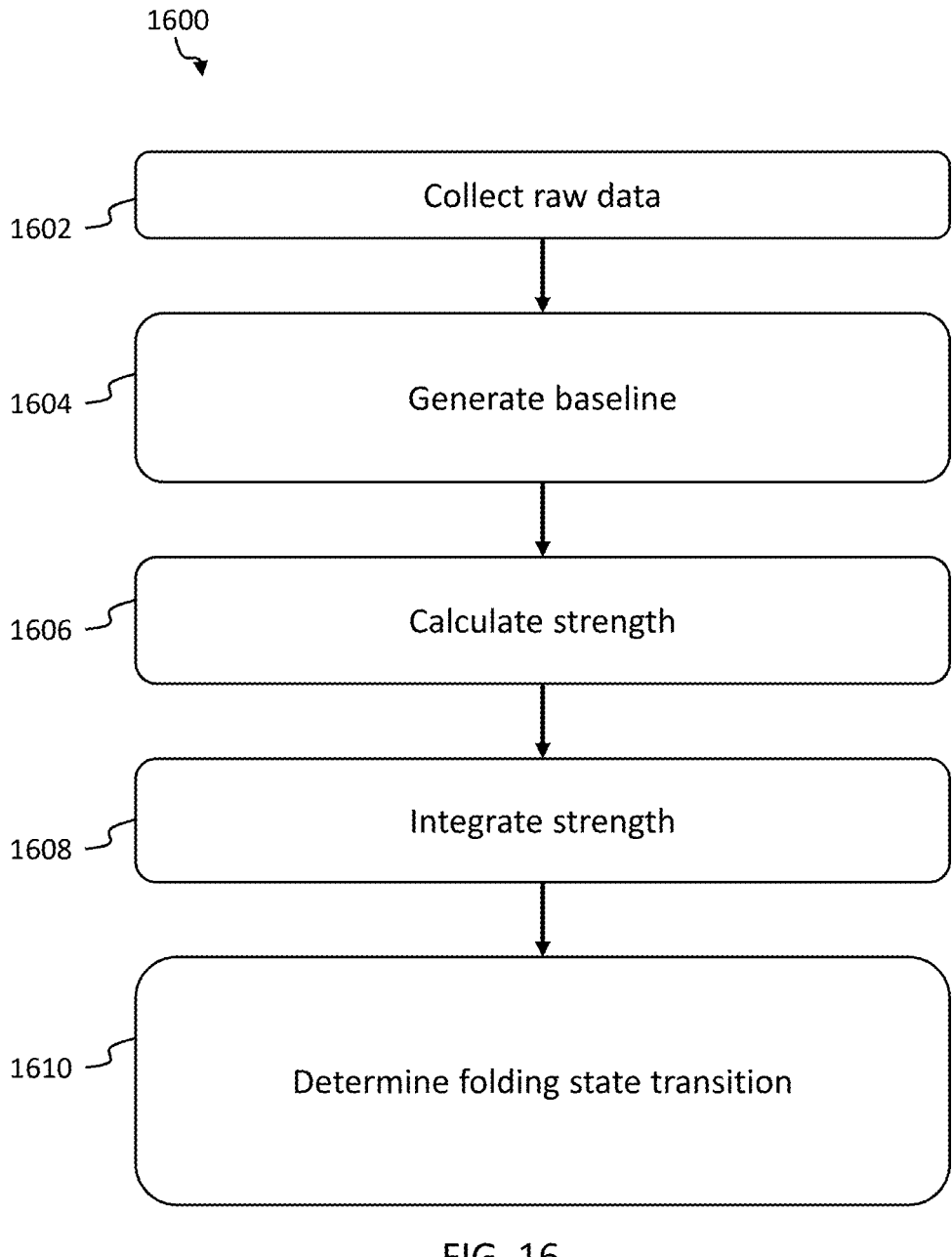
FIG. 16 illustrates a flowchart for determining a transition of a folding state for a foldable device according to an embodiment of the present application.

FIG. 16 illustrates a flowchart for determining a transition of a folding state for a foldable device according to an embodiment of the present application.

The process 1600 begins by collecting raw data in step 1602. The raw data can be obtained by the touchscreen controller 110 from capacitive sensors that correspond to receive channels. The raw data represents the capacitance measurements on a first portion of the device and the capacitance measurements on a second portion of the device. In one or more embodiments, the capacitance measurements may be located near an edge of the first portion and an opposing edge of the second portion of the foldable device. The capacitance measurements on the first portion and the second portion of the device capture the changes in capacitance that occur as the device is opened or closed.

Following step 1602, the process continues to generate a baseline in step 1604. The baseline is generated by accumulating raw data over a series of past frames and calculating the average from a sum of the accumulated raw data. In one or more embodiments, the baseline serves as a reference point for the system to detect gradual changes in the capacitance measurements.

Following step 1604, the process continues to create strength data in step 1606. The strength data is calculated based on the generated baseline in step 1604 and the collected raw data in step 1602. In one or more embodiments, the strength data is calculated by subtracting the collected raw data for a current frame from the generated baseline. In other words, the strength data is a difference between the raw data of the current frame collected in step 1602 and the average of the sum of the accumulated raw data during past frames. The strength data can be used to determine when the folding state of the device transitions between open and closed.

Following step 1606, the process 1600 continues to calculate integrated strength data in step 1608. In one or more embodiments, the integrated strength data can be calculated by integrating the strength data calculated in step 1604 over a noise level. The integrated strength data can be used to determine when the device transitions from a previous folding state.

Following step 1608, the process 1600 continues to determine the folding state of the device in step 1610. In various embodiments, the folding state can be determined by comparing the integrated strength data with a predetermined open or close threshold. When the integrated strength data reaches the open or close threshold, the folding state transitions from a previous folding state to a current folding state. For example, when the folding state is open and the integrated strength data reaches a close threshold, the folding state transitions to a closed state. When the integrated strength data does not reach the open or close threshold, the fold state remains in the previous folding state. For example, when the folding state is closed and the integrated strength does not reach the open threshold, the folding state remains in the closed state. In other words, when the integrated strength data reaches or exceeds the predetermined open or close thresholds, the system determines that a state change has occurred. When the integrated strength does not reach the predetermined open or close threshold, the system maintains the previous open/close state.

Figure 17:
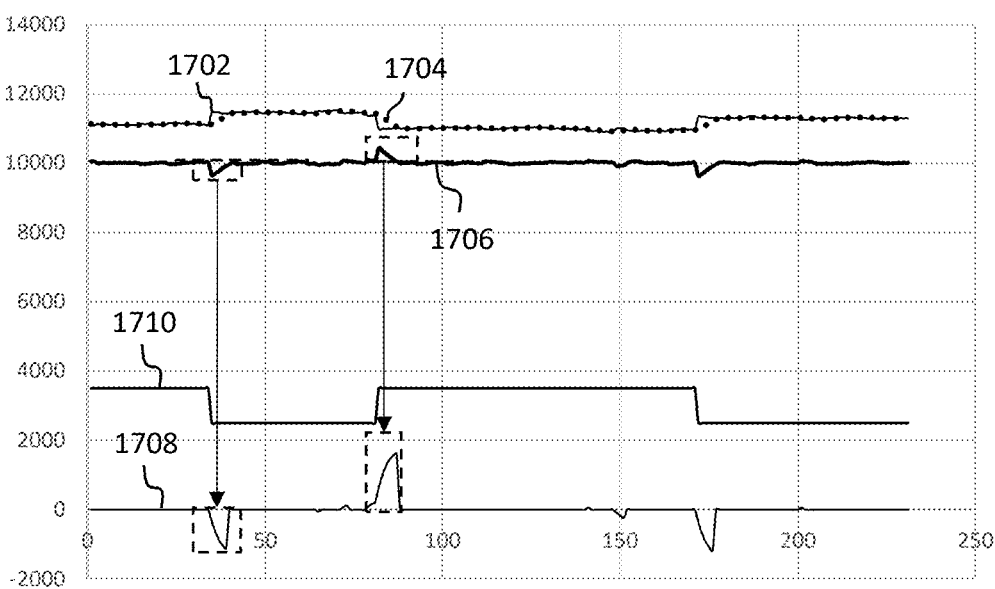
FIG. 17 illustrates a graph for determining a transition of a folding state for a device according to an embodiment of the present application.

FIG. 17 illustrates a graph for determining a transition of a folding state for a device according to an embodiment of the present application. FIG. 17 will be described in conjunction with FIG. 16. The graph 1700 shows multiple data series over time or over frame measurements. Each data series represents a different step in the process 1600. The x-axis represents time or number of frames and the y-axis represents a magnitude for various measurements.

The data series 1702 represents the raw data collected by the touch controller in step 1602. The data series 1704 (i.e., represented by the dotted line), partially overlapping data series 1702 (i.e., represented by the solid line), represents a baseline created in step 1604. The data series 1706 represents the strength data calculated in step 1606. The data series 1708 represents the integrated strength calculated in step 1608. The data series 1710 represents the folding states determined in step 1610 based on the integrated strength data in data series 1708.

The graph 1700 illustrates the relationship between these different data series. For instance, when the raw data 1702 diverges from the baseline 1704, a corresponding change in the strength data 1706, the integrated strength data 1708, and the folding state or open/close state 1710 can be observed. This visual representation demonstrates how the raw data is processed and interpreted to determine transitions folding state of the device.

Example embodiments of the invention are described below. Other embodiments can also be understood from the entirety of the specification as well as the claims filed herein.

Example 1. A first example comprises a method that includes measuring raw data by simultaneously driving a plurality of channels of a foldable device, collecting the raw data from a first channel on a first portion and a second channel on a second portion of the device, the first channel being positioned opposite from the second channel relative to a folding axis of the foldable device, determining a distance between the first channel and the second channel based on the collected raw data, generating a baseline capacitance based on the distance between the first channel and the second channel, filtering the generated baseline capacitance, calculating strength data based on the filtered baseline capacitance and the collected raw data, and determining a folding state based on the calculated strength data.

Example 2. The method of example 1, where measuring the raw data includes simultaneously driving a plurality of force channels, receiving a signal from a plurality of sense channels, and measuring a mutual capacitance between the force channels and the sense channels.

Example 3. The method of example 1 or 2, where the mutual capacitance is inversely proportional to the distance between the first channel and the second channel.

Example 4. The method of examples 1 to 3, where the force channels are perpendicular to the folding axis and wherein the sense channels are parallel to the folding axis.

Example 5. The method of examples 1 to 4, where the first channel extends along a first edge of the foldable device and the second channel extends along a second edge of the foldable device.

Example 6. The method of examples 1 to 5, where measuring the raw data comprises simultaneously driving a plurality of sense channels, receiving a signal from a plurality of force channels, and measuring a mutual capacitance between the sense channels and the force channels, where the mutual capacitance is inversely proportional to the distance between the first edge of the foldable device and the second edge of the foldable device.

Example 7. The method of examples 1 to 6, where the sense channels are perpendicular to the folding axis and the force channels are parallel to the folding axis.

Example 8. The method of examples 1 to 7, where generating the baseline capacitance comprises setting the baseline capacitance equal to the raw data when the distance between the first channel and the second channel indicate the folding state is open.

Example 9. The method of examples 1 to 8, where generating the baseline capacitance comprises setting the baseline capacitance equal to the raw data and an offset when the distance between the first channel and the second channel indicate the folding state is closed.

Example 10. The method of examples 1 to 9, where the strength data is a difference between the filtered baseline and the raw data.

Example 11. The method of examples 1 to 10, where determining the folding state comprises determining that the folding state is closed when the calculated strength data is greater than a predetermined threshold, and determining that the folding state is open when the calculated strength data is less than or equal to the predetermined threshold.

Example 12. The method of examples 1 to 11, where determining the folding state comprises determining a previous folding state based on previous calculated strength data, determining that the folding state is closed when the previous folding state is open and the calculated strength data is greater than or equal to the predetermined high threshold or the calculated strength data is less than or equal to the predetermined low threshold, determining that the folding state is closed when the previous folding state is closed and the calculated strength data is greater than the predetermined low threshold and less than the predetermined high threshold, determining that the folding state is open when the previous folding state is closed and the calculated strength data is greater than or equal to the predetermined high threshold or the calculated strength data is less than or equal to the predetermined low threshold, and determining that that folding state is open when the previous folding state is open and the calculated strength data is greater than the predetermined low threshold and less than the predetermined high threshold.

Example 13. A second example comprises a method that includes collecting raw data from a first edge and a second edge of a touchscreen over a plurality of frames, the first edge being positioned opposite from the second edge relative to a hinge of a touchscreen device, generating a baseline capacitance based on an average of the collected raw data, calculating strength data based on a difference between a current raw data and the average of the collected raw data, integrating the strength data over a noise level, comparing the integrated strength data with an open/close threshold, and changing an open/close state from a previous open/close state when the integrated strength data is greater than or equal to an open/close threshold.

Example 14. The method of example 13, where collecting raw data from the first edge and the second edge of the touchscreen includes simultaneously driving a plurality of force channels, receiving a signal from a plurality of sense channels, and measuring a mutual capacitance between the force channels and the sense channels.

Example 15. The method of examples 13 or 14, where the mutual capacitance is inversely proportional to a distance between the first edge and the second edge.

Example 16. The method of examples 13 to 15, where the force channels are perpendicular to the hinge and the sense channels are parallel to the hinge.

Example 17. The method of examples 13 to 16, where collecting raw data from the first edge and the second edge of the touchscreen includes simultaneously driving a plurality of sense channels, receiving a signal from a plurality of force channels, and measuring a mutual capacitance between the sense channels and the force channels, where the mutual capacitance is inversely proportional to a distance between the first edge and the second edge.

Example 18. The method of examples 13 to 17, where the sense channels are perpendicular to the hinge and the force channels are parallel to the hinge.

Example 19. A third example comprises a device that includes a first touchscreen portion, a second touchscreen portion, a hinge connecting the first touchscreen portion and the second touchscreen portion, and a touch controller. The touch controller can be configured to simultaneously drive a plurality of drive channels to measure raw data, receive raw data from a first receive channel of the first touchscreen portion and a corresponding second receive channel of the second touchscreen portion, where the first receive channel and the second receive channel are perpendicular to the drive channels, determine a distance between the first receive channel and the second receive channel, generate a baseline capacitance based on the distance between the first receive channel and the second receive channel, filter the generated baseline capacitance, calculate strength data based on the filtered baseline capacitance and the received raw data, and determine a folding state based on the calculated strength data.

Example 20. The device of example 19, where the first receive channel is on an outer edge of the first touchscreen portion and the second receive channel is on an outer edge of the second touchscreen portion.

Example 21. The device of examples 19 or 20, where the touch controller is further configured to determine that the folding state is closed when the calculated strength data is greater than a predetermined threshold, and determine that the folding state is open when the calculated strength data is less than or equal to the predetermined threshold.

Example 22. The device of examples 19 to 21, where the touch controller is further configured to determine a previous folding state based on previous calculated strength data, determine that the folding state is closed when the previous folding state is open and the calculated strength data is greater than or equal to the predetermined high threshold or the calculated strength data is less than or equal to the predetermined low threshold, determine that the folding state is closed when the previous folding state is closed and the calculated strength data is greater than the predetermined low threshold and less than the predetermined high threshold, determine that the folding state is open when the previous folding state is closed and the calculated strength data is greater than or equal to the predetermined high threshold or the calculated strength data is less than or equal to the predetermined low threshold, and determine that that folding state is open when the previous folding state is open and the calculated strength data is greater than the predetermined low threshold and less than the predetermined high threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
measuring raw data by simultaneously driving a plurality of channels of a foldable touchscreen device, wherein the foldable touchscreen device includes a first touchscreen portion, a second touchscreen portion, and a hinge connecting the first touchscreen portion and the second touchscreen portion;
collecting the raw data from a first channel on the first touchscreen portion and a second channel on the second touchscreen portion of the device, the first channel being positioned opposite from the second channel relative to a folding axis of the foldable touchscreen device;
determining a distance between the first channel and the second channel based on the collected raw data;
generating a baseline capacitance based on the distance between the first channel and the second channel;
filtering the generated baseline capacitance;
calculating strength data based on the filtered baseline capacitance and the collected raw data; and
determining a folding state based on the calculated strength data.

2. The method of claim 1, wherein measuring the raw data comprises:
simultaneously driving a plurality of force channels;
receiving a signal from a plurality of sense channels; and
measuring a mutual capacitance between the force channels and the sense channels.

3. The method of claim 2, wherein the mutual capacitance is inversely proportional to the distance between the first channel and the second channel.

4. The method of claim 2, wherein the force channels are perpendicular to the folding axis and wherein the sense channels are parallel to the folding axis.

5. The method of claim 1, wherein the first channel extends along a first edge of the foldable touchscreen device and the second channel extends along a second edge of the foldable touchscreen device.

6. The method of claim 5, wherein measuring the raw data comprises:
simultaneously driving a plurality of sense channels;
receiving a signal from a plurality of force channels; and
measuring a mutual capacitance between the sense channels and the force channels, wherein the mutual capacitance is inversely proportional to the distance between the first edge of the foldable touchscreen device and the second edge of the foldable touchscreen device.

7. The method of claim 6, wherein the sense channels are perpendicular to the folding axis and the force channels are parallel to the folding axis.

8. The method of claim 1, wherein generating the baseline capacitance comprises setting the baseline capacitance equal to the raw data when the distance between the first channel and the second channel indicates the folding state is open.

9. The method of claim 1, wherein generating the baseline capacitance comprises setting the baseline capacitance equal to the raw data and an offset when the distance between the first channel and the second channel indicates the folding state is closed.

10. The method of claim 1, wherein the strength data is a difference between the filtered baseline capacitance and the raw data.

11. The method of claim 1, wherein determining the folding state comprises:
   determining that the folding state is closed when the calculated strength data is greater than a predetermined threshold; and
   determining that the folding state is open when the calculated strength data is less than or equal to the predetermined threshold.

12. The method of claim 11, wherein determining the folding state comprises:
   determining a previous folding state based on previous calculated strength data;
   determining that the folding state is closed when the previous folding state is open and the calculated strength data is greater than or equal to a predetermined high threshold or the calculated strength data is less than or equal to a predetermined low threshold;
   determining that the folding state is closed when the previous folding state is closed and the calculated strength data is greater than the predetermined low threshold and less than the predetermined high threshold;
   determining that the folding state is open when the previous folding state is closed and the calculated strength data is greater than or equal to the predetermined high threshold or the calculated strength data is less than or equal to the predetermined low threshold; and
   determining that the folding state is open when the previous folding state is open and the calculated strength data is greater than the predetermined low threshold and less than the predetermined high threshold.

13. A method comprising:
   collecting raw data from a first edge of a first touchscreen portion and a second edge of a second touchscreen portion of a foldable touchscreen device over a plurality of frames, the first edge being positioned opposite from the second edge relative to a hinge connecting the first touchscreen portion and the second touchscreen portion of the foldable touchscreen device;
   generating a baseline capacitance based on an average of the collected raw data;
   calculating strength data based on a difference between a current raw data and the average of the collected raw data;
   integrating the strength data over a noise level;
   comparing the integrated strength data with an open/close threshold; and
   changing an open/close folding state from a previous open/close folding state when the integrated strength data is greater than or equal to the open/close threshold.

14. The method of claim 13, wherein collecting the raw data from the first edge of the first touchscreen portion and the second edge of the second touchscreen portion comprises:
   simultaneously driving a plurality of force channels;
   receiving a signal from a plurality of sense channels; and
   measuring a mutual capacitance between the force channels and the sense channels.

15. The method of claim 14, wherein the mutual capacitance is inversely proportional to a distance between the first edge and the second edge.

16. The method of claim 14, wherein the force channels are perpendicular to the hinge and the sense channels are parallel to the hinge.

17. The method of claim 13, wherein collecting the raw data from the first edge of the first touchscreen portion and the second edge of the second touchscreen portion comprises:
   simultaneously driving a plurality of sense channels;
   receiving a signal from a plurality of force channels; and
   measuring a mutual capacitance between the sense channels and the force channels, wherein the mutual capacitance is inversely proportional to a distance between the first edge and the second edge.

18. The method of claim 17, wherein the sense channels are perpendicular to the hinge and the force channels are parallel to the hinge.

19. A device comprising:
   a first touchscreen portion;
   a second touchscreen portion;
   a hinge connecting the first touchscreen portion and the second touchscreen portion; and
   a touch controller configured to:
      simultaneously drive a plurality of drive channels to measure raw data;
      receive raw data from a first receive channel of the first touchscreen portion and a corresponding second receive channel of the second touchscreen portion, wherein the first receive channel and the second receive channel are perpendicular to the drive channels;
      determine a distance between the first receive channel and the second receive channel;
      generate a baseline capacitance based on the distance between the first receive channel and the second receive channel;
      filter the generated baseline capacitance;
      calculate strength data based on the filtered baseline capacitance and the raw data; and
      determine a folding state based on the calculated strength data.

20. The device of claim 19, wherein the first receive channel is on an outer edge of the first touchscreen portion and the second receive channel is on an outer edge of the second touchscreen portion.

21. The device of claim 19, wherein the touch controller is further configured to:
   determine that the folding state is closed when the calculated strength data is greater than a predetermined threshold; and
   determine that the folding state is open when the calculated strength data is less than or equal to the predetermined threshold.

22. The device of claim 19, wherein the touch controller is further configured to:
   determine a previous folding state based on previous calculated strength data;

determine that the folding state is closed when the previous folding state is open and the calculated strength data is greater than or equal to a predetermined high threshold or the calculated strength data is less than or equal to a predetermined low threshold;

determine that the folding state is closed when the previous folding state is closed and the calculated strength data is greater than the predetermined low threshold and less than the predetermined high threshold;

determine that the folding state is open when the previous folding state is closed and the calculated strength data is greater than or equal to the predetermined high threshold or the calculated strength data is less than or equal to the predetermined low threshold; and determine that the folding state is open when the previous folding state is open and the calculated strength data is greater than the predetermined low threshold and less than the predetermined high threshold.

* * * * *